(12) United States Patent
Hollander et al.

(10) Patent No.: US 7,506,246 B2
(45) Date of Patent: Mar. 17, 2009

(54) PRINTING A CUSTOM ONLINE BOOK AND CREATING GROUPS OF ANNOTATIONS MADE BY VARIOUS USERS USING ANNOTATION IDENTIFIERS BEFORE THE PRINTING

(75) Inventors: Josef Hollander, Irvine, CA (US); Mor Schlesinger, Ramat Hasharon (IL)

(73) Assignee: Sharedbook Limited, George Town (KY)

(*) Notice: Subject to any disclaimer, the term of this patent is extended or adjusted under 35 U.S.C. 154(b) by 0 days.

(21) Appl. No.: 11/099,817

(22) Filed: Apr. 6, 2005

(65) Prior Publication Data

US 2006/0053365 A1   Mar. 9, 2006

Related U.S. Application Data

(63) Continuation of application No. 10/936,788, filed on Sep. 8, 2004.

(51) Int. Cl.
*G06F 15/00* (2006.01)

(52) U.S. Cl. .................. 715/230; 715/231; 715/232; 715/233; 715/234; 715/274

(58) Field of Classification Search ............ 715/501.1, 715/512–513, 530–531, 500, 200, 205–206, 715/255–256, 230–233, 234
See application file for complete search history.

(56) References Cited

U.S. PATENT DOCUMENTS

| | | | |
|---|---|---|---|
| 5,165,012 A | 11/1992 | Crandall et al. | |
| 5,220,657 A | 6/1993 | Bly et al. | |
| 5,231,578 A | 7/1993 | Levin et al. | |
| 5,341,293 A * | 8/1994 | Vertelney et al. | ............ 715/530 |
| 5,392,400 A | 2/1995 | Berkowitz et al. | |
| 5,671,428 A | 9/1997 | Muranaga et al. | |
| 5,765,152 A | 6/1998 | Erickson | |
| 5,806,079 A | 9/1998 | Rivette et al. | |
| 5,821,931 A | 10/1998 | Berquist et al. | |
| 5,822,539 A | 10/1998 | van Hoff | |
| 5,826,025 A | 10/1998 | Gramlich | |
| 5,831,615 A | 11/1998 | Drews et al. | |
| 5,832,474 A | 11/1998 | Lopresti et al. | |
| 5,838,914 A | 11/1998 | Carleton et al. | |
| 5,845,301 A | 12/1998 | Rivette et al. | |

(Continued)

OTHER PUBLICATIONS

"Getting Results with Microsoft Office 97", 1995-1997 Microsoft Corporation.

(Continued)

*Primary Examiner*—Cesar B Paula
(74) *Attorney, Agent, or Firm*—Knobbe, Martens, Olson & Bear, LLP

(57) ABSTRACT

The invention relates generally to shared annotation systems and provides a method for automatically navigating a document in a display that has at least a first portion and a second portion. An annotation related to the document may be generated by a user at a first client. The annotation can be received and associated with a first indication in the document. An input to navigate a first portion of a display may be received from a user at the second client. The input causes the first indication to be displayed in the first portion of the display; and in response to the input, the annotation is automatically displayed in a second portion of the display at the second client.

24 Claims, 17 Drawing Sheets

U.S. PATENT DOCUMENTS

| | | | |
|---|---|---|---|
| 5,860,074 | A | 1/1999 | Rowe et al. |
| 5,870,547 | A | 2/1999 | Pommier et al. |
| 5,870,759 | A | 2/1999 | Bauer et al. |
| 5,890,177 | A * | 3/1999 | Moody et al. ............... 715/511 |
| 5,966,512 | A | 10/1999 | Bates et al. |
| 6,052,514 | A | 4/2000 | Gill et al. |
| 6,052,695 | A | 4/2000 | Abe et al. |
| 6,081,291 | A | 6/2000 | Ludwig, Jr. |
| 6,081,829 | A * | 6/2000 | Sidana ...................... 709/203 |
| 6,134,568 | A * | 10/2000 | Tonkin ....................... 715/526 |
| 6,161,149 | A | 12/2000 | Achacoso et al. |
| 6,230,172 | B1 | 5/2001 | Purnaveja et al. |
| 6,240,444 | B1 | 5/2001 | Fin et al. |
| 6,262,728 | B1 | 7/2001 | Alexander |
| 6,308,199 | B1 | 10/2001 | Katsurabayashi |
| 6,327,600 | B1 * | 12/2001 | Satoh et al. ................. 715/530 |
| 6,332,149 | B1 * | 12/2001 | Warmus et al. ............ 715/517 |
| 6,336,134 | B1 | 1/2002 | Varma |
| 6,342,906 | B1 | 1/2002 | Kumar et al. |
| 6,353,851 | B1 | 3/2002 | Anupam et al. |
| 6,360,250 | B1 | 3/2002 | Anupam et al. |
| 6,438,564 | B1 | 8/2002 | Morton et al. |
| 6,457,026 | B1 | 9/2002 | Graham et al. |
| 6,493,731 | B1 | 12/2002 | Jones et al. |
| 6,507,845 | B1 | 1/2003 | Cohen et al. |
| 6,507,865 | B1 * | 1/2003 | Hanson et al. ............ 705/36 R |
| 6,571,295 | B1 | 5/2003 | Sidana |
| 6,584,479 | B2 * | 6/2003 | Chang et al. ................ 715/512 |
| 6,601,087 | B1 | 7/2003 | Zhu et al. |
| 6,687,878 | B1 * | 2/2004 | Eintracht et al. ............ 715/512 |
| 6,760,772 | B2 * | 7/2004 | Zou et al. ................... 709/230 |
| 6,859,909 | B1 * | 2/2005 | Lerner et al. ................ 715/512 |
| 7,028,267 | B1 * | 4/2006 | Beezer et al. ............... 715/802 |
| 2002/0026398 | A1 * | 2/2002 | Sheth ......................... 705/37 |
| 2002/0059342 | A1 | 5/2002 | Gupta et al. |
| 2002/0078035 | A1 | 6/2002 | Frank et al. |
| 2003/0182210 | A1 * | 9/2003 | Weitzman et al. ............ 705/27 |
| 2004/0210833 | A1 * | 10/2004 | Lerner et al. ................ 715/512 |
| 2005/0256867 | A1 * | 11/2005 | Walther et al. ................ 707/5 |
| 2006/0020882 | A1 * | 1/2006 | Beezer et al. ............... 715/512 |
| 2006/0048046 | A1 * | 3/2006 | Joshi et al. .................. 715/512 |

OTHER PUBLICATIONS

U.S. Appl. No. 11/099,768; Office Action dated Sep. 11, 2007.
Caitlin, et al., "Internote: Extending a Hypermedia Framework to Support Annotative Collaboration", Hypertext '89 Proceedings, Nov. 1989, pp. 365-378.
Hardock et al., "A Marking Based Interface for Collaborative Writing", ACM Symposium on User Interface Software and Technology, portal. acm. org. pp. 259-266, 1993.
Wilcox, Lynn D. et al. "Dynomite: A Dynamically Organized Ink and Audio Notebook", CHI 97, Mar. 22-27, 1997. pp. 186-193.
Price, Morgan N, et al. "XLibris: The Active Reading Machine". CHI 98, Apr. 18-23, 1998. pp. 22-23.
Schilit, Bill N. et al. "Beyond Paper: Supporting Active Reading with Free Form Digital Ink Annotations". CHI 98, Apr. 18-23, 1998. pp. 249-256.
Schilit, Bill N. et al., "Digital Library Information Appliances" Digital Library 98; Pittsburgh, PA. pp. 217-226.
Moran, Thomas P. et al. "Spatial Interpretation of Domain Objects Integrated into a Freeform Electronic Whiteboard" UIST '98, San Francisco, AC pp. 175-184.
Kurtenbach, Gordon et al. "Issues in Combining Marking and Direct Manipulation Techniques" UIST '91, Nov. 11-13, 1991. pp. 137-144.
Long Jr., A. Chris, "Dissertation Proposal: The Design and Evaluation of Gestures for Pen-based User Interfaces". Qualifying Exam Proposal References, pp. 1-8.
Gross, Mark D., et al. "Ambiguous Intentions: a Paper-like Interface for Creative Design", UIST '96, Seattle Washington. pp. 183-192.
Moran, Thomas, P. et al., "Pen-Based Interaction Techniques for Organizing Material on an Electronic Whiteboard". UIST '97, Banff, Alberta, Canada. pp. 45-54.
Forsberg, Andrew et al., "The Music Notepad". Brown University, Providence RI, 7 pages.
Dragacevic, P. Combining crossing-based & paper-based Interaction Paradigms . . . Proceedings of the ACM 2004 symposium on User interface software and tech. , pp. 193-196.
Davis, Richard C., et al. "A Framework for Sharing Handwritten Notes". UIST '98, San Francisco, CA. pp. 119-120.
Landay, James A. et al. "Sketching Storyboards to Illustrate Interface Behaviors". HCI Institute, Carnegie Mellon University, 2 pages.
Landay, James A. et al. "Interactive Sketching for the Early Stages of User Interface Design", Carnegie Mellon University, 8 pages.
Long, Jr., Allan Christian "Improving Gestures and Interaction Techniques for Pen-Based User Interfaces". CHI '98, Apr. 18-23, 1998. pp. 58-59.
Rubine, Dean. "Combining Gestures and Direct Manipulation" CHI '92, May 3-7, 1992. pp. 659-660.
Kurtenbach, Gordon et al. "Contextual Animation of Gestural Commands". Xerox Palo Alto Research Center, Palo Alto, CA, University of Toronto, 14 pages.
Tapia, Mark A., et al., "Some Design Refinements and Principles on the Appearance and Behavior of Marking Menus" UIST '95, Nov. 14-17, 1995. pp. 189-195.
Moran, Thomas P. et al. "Implicit Structures for Pen-Based Systems Within a Freeform Interaction Paradigm", Xerox Palo Alto Research Center, Palo Alto, CA, 11 pages.
Bier, Eric A. et al. "Toolglass and Magic Lenses: The See-Through Interface" Xerox Palo Alto Research Ctr., Palo Alto, CA, Univ. of Toronto, Univ. of Washington, 8 pages.
Trigg et al, "Supporting Collaboration in Notecards", Proceedings of the 1986 ACM conference on Computer-supported cooperative work, Dec. 1986, pp. 153-162.

* cited by examiner

```
<body bgcolor="#ffffff" text="#000000" link="#C00000" vlink="#C00000"
    onclick="selectionChanged();return true;"
    onresize="idFirstLine.style.display='none';idYellow.style.display='none';
              idLastLine.style.display='none';return true;">
<div class="shrdbk_main">

<p id="shrdbk_N10038">
   "Hidell" name on the post office box application was part of Oswald's use of a
nonexistent
   "Hidell" to serve as president of the so-called New Orleans Chapter of the Fair Play for
Cuba
   Committee. (As discussed below in ch.VI, p. 292.) arina Oswald testified that she first
learned
   of Oswald's use of the fictitious name "Hidell" in connection with his pro-Castro
activities in
   New Orleans. According to her testimony, he compelled her to write the name "Hidell" on
membership cards in the space designated for the signature of the "Chapter President."
   <span xmlns="" class="shrdbk_start_element" id="startOfC1141_554" />
   The name "Hidell" was stamped on some of the chapter's printed literature and on the
membership application blanks.
   <span xmlns="" class="shrdbk_end_element" id="endOfC1141_681" />
   <span xmlns="" class="shrdbk_icons">
     <img id="imgOfC1141_681" src="icons/comments/icon_commentdouble_1.gif" border="0"

onMouseOver="javascript:displayBookElement('contentOfC1141_681','inline','imgOfC1141_681');"

onMouseOut="javascript:displayBookElement('contentOfC1141_681','none','imgOfC1141_681');"
/>
   </span>
   Marina Oswald testified, "I knew there was no such organization. And I know Hidell is
merely an
   altered Fidel, and I laughed at such foolishness." Hidell was a fictitious president of
an
   organization of which Oswald was the only member
  </p>

</div>

<div id="idYellow" style="position:absolute;z-index:
1;background:yellow;display:none"/>
<div id="idFirstLine" style="position:absolute;z-index:
1;background:yellow;display:none"/>
<div id="idLastLine" style="position:absolute;z-index:
1;background:yellow;display:none"/>

<div id="contentOfC1141_681"
     style="position:absolute;width:250px;z-index:1;background-color:'#FFFF99';display:
none;"

onMouseOver="javascript:displayBookElement('contentOfC1141_681','inline','imgOfC1141_681');"

onMouseOut="javascript:displayBookElement('contentOfC1141_681','none','imgOfC1141_681');">
  <p>
   <font color="blue" size="1" face="Verdana, Arial, Helvetica, sans-serif">
    <u style="cursor:hand" onclick="setIsBodyEvent(false);

javascript:findBookElementLocation('startOfC1141_554','endOfC1141_681');
             javascript:gotoBookElementId('C1141_681','comments');return
false;">
     (1) that day at the Air Force
    </u>
    <br/>
   </font>
  </p>
 </div>
</body>
```

Fig. 5A

```
<html>
<head>
    <title>Warren Report: Foreword</title>
    ...
</head>
<body onclick="selectionChanged();return true;" ondblclick="selectionChanged();return true;" ...>
    ...
    <div id="shrdbkMain" class="shrdbk_main" ...>

<h1 id="shrdbk_N10015">Warren Report: Foreword</h1>

<p id="shrdbk_N10016">
            <span id="CommentOfshrdbk_N10016" class="shrdbk_items noprint comment_icon" ...>
                <sup class="comment_icon">1</sup>
            </span>
            PRESIDENT LYNDON B. JOHNSON, by Executive Order No. 11130 dated November 29, 1963, created
            this Commission to investigate the assassination on November 22, 1963, of John Fitzgerald
            Kennedy,  the <span xmlns="" class="shrdbk_start_elements" id="startOfC1315_194"...></span>
            35th President of the United States. The President directed
            <span xmlns="" class="shrdbk_end_elements" id="endOfC1315_253" style="position:relative;"></span>
            <span xmlns="" class="shrdbk_icons" id="imgOfC1315_253" ...> <sup class="comment_icon">1</sup>
            </span> the Commission to evaluate all the facts and circumstances surrounding the assassination and the
            subsequent killing of the alleged assassin and to report its findings and conclusions to him.
        </p>

<p id="shrdbk_N10018">
            The subject of the Commission's inquiry was ...
        </p>
    </div>
    <div xmlns="" id="content" style="display:none;">
        <span id="imgOfC1315_253" style="display:none;">
            <span>
                1.
                <font id="C1315_253" class="bookArea"
                    onclick="top.findBookElementLocation('startOfC1315_194','endOfC1315_253'); ..." ...>
                    35th President of the United States. The
                </font>
            </span>
        </span>
        <span id="CommentOfshrdbk_N10016" class="comment_icon" >
            <span>
                1.
                <font id="C1315_253" class="bookArea"
                    onclick="top.FindBookElementLocation('startOfC1315_194','endOfC1315_253'); ..." ...>
                    35th President of the United States. The
                </font>
            </span>
        </span>
    </div>
```

Fig. 5B

PRINTING A CUSTOM ONLINE BOOK AND CREATING GROUPS OF ANNOTATIONS MADE BY VARIOUS USERS USING ANNOTATION IDENTIFIERS BEFORE THE PRINTING

RELATED APPLICATION

This application is a continuation of U.S. application Ser. No. 10/936,788, filed Sep. 8, 2004, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosures, as it appears in the Patent and Trademark Office patent files or records, but otherwise reserves all copyright rights whatsoever.

BACKGROUND OF THE INVENTION

The inventions disclosed herein relate generally to collaborative systems and more particularly to shared annotation systems.

Users often wish to collaborate on shared documents in a network. For example, in a business environment, users at different companies may collaborate on a business agreement such as creating a contract or a license agreement.

One issue associated with network collaboration is synchronicity. For example, users often collaborate by exchanging versions of documents via e-mail or other similar means. A first user edits or otherwise comments a document and then sends the revised version to a second user for further input. The second user makes or otherwise provides their input and then e-mails the new document back to the first user. While the first user is editing the document, however, the second user cannot provide input since they do not possess the current version of the document (currently being edited by the first user) and therefore do not know what changes the first user might be making. Similarly, the first user cannot provide further input while the document is being edited by the second user. It is thus desirable for users to be able to provide synchronous comments and edits without having to wait for other users.

Another issue associated with network collaboration is application heterogeneity. In existing systems, users must have the same specialized collaboration software in order to collaborate and share information. For example, one current collaborative system by iMarkup Solutions of Vista, Calif. requires both users to download and install a specialized plug-in in order to extend collaborative functionality to the user systems. Many users find this technically challenging to configure or simply inconvenient. It is thus desirable for users to be able to collaborate using tools that are application agnostic and do not require additional specialized software.

U.S. Pat. No. 6,43 8,564 discusses a system which allows users to associate discussions within documents. Discussions include comments, annotations, and notes and are associated with documents by associating the discussion with a document identifier. Discussions are stored separately from their related documents. When a particular document is requested by a user, any related discussions associated with the identifier for the document are also retrieved. The system discussed in the '564 application has a number of shortcomings. For example, in the '564 patent, only HTML text associated with a discussion is stored. If the discussion is linked to another item, for example a media item, such as a graphic, a video clip, an audio clip, etc., the media file is not stored in the system database containing the HTML text and other data associated with the discussion. Also, only a link to the media is stored. Thus, if a user desires to use a media item in a discussion, they must first upload the item to a separate web server or else the link in the '564 patent system database to the item will be invalid. This presents users with a significant inconvenience. Further, the system only parses HTML tag data such as paragraphs, lists, images, and tables, to determine a location for a discussion within a document. Discussions are thus limited to hanging off of paragraphs, lists, images, tables, etc. and a user is not, for example, able to link a discussion to an arbitrary word or phrase within the document. This lack of flexibility limits the user's ability to freely comment within a document and also presents a significant limitation with respect to the level of granularity at which a given document may be discussed. Using the '564 patent system, for example, a user could not comment on individual words in a poem which might be highly desirable given the importance of individual word choice in poetry.

There is thus a need for systems and methods which are application agnostic and allow users to synchronously share annotations regarding a particular document. There is also a need for systems and methods which permit users to place annotations at any arbitrary location within a document.

SUMMARY OF THE INVENTION

The present invention addresses, among other things, the problems discussed above with shared annotation systems. In accordance with some aspects of the present invention, computerized methods are provided for enabling a plurality of users to collaborate or otherwise provide annotations and other input and feedback related to shared documents and content in a computer network. Users are able to synchronously navigate content via multi-portion displays in which indicators related to the annotations are embedded in document content in a first portion of the display and the related annotations are synchronously presented in at least a second portion of the display. In some embodiments, the system also generates custom documents based on annotated content, provides commerce opportunities related to annotated content, persistently presents selected multimedia content while navigating a plurality of document pages, and accepts and indexes annotations related to visual content elements such as graphics and photographs.

In one embodiment, the system enables a method for automatically navigating a document in a display having at least a first portion and a second portion, the method comprising: receiving an annotation related to the document, the annotation generated by a user at a first client; associating the annotation with a first indication in the document; receiving, from a user at a second client, an input to navigate a first portion of a display at the second client, the input causing the first indication to be displayed in the first portion of the display; and in response to the input, automatically displaying the annotation in a second portion of the display at the second client.

In some embodiments, the display comprises a browser window, such as an Internet browser. In some embodiments, the document comprises an electronic book, a digital photo album containing one or more digital photos, a web page, a text document, or a multimedia document. In some embodiments, the annotation comprises a text annotation, such as a comment related to the document. In other embodiments, the annotation comprises a graphical annotation, such as a photograph. In other embodiments, the annotation comprises an audio annotation, a video annotation, a multimedia annotation, or a discussion group related to the document. In some embodiments, the input comprises an input to scroll the first portion of the display or an input to navigate to a portion of the document containing the first indication. In some embodiments, the first indication comprises a graphical indication, such as an icon. In some embodiments, receiving an annotation comprises receiving form data submitted by the user at the first client, such as receiving HTML form data.

In some embodiments, associating the annotation with a first indication in the document comprises: identifying a portion of the document to which the annotation relates; and associating the first indication with the portion of the document to which the annotation relates. For example, in some embodiments, the annotation comprises a discussion group related to the portion of the document. In some embodiments, the annotation is added to a data structure stored in memory, the data structure comprising a list of annotations relating to portions of one or more documents. In some embodiments, the list of annotations comprises a list of bookmarks. In some embodiments, the system receives input selecting an annotation from the list of bookmarks and displays, in the first portion of the display, at least a portion of a document to which the annotation is related and displays at least the selected annotation in the second portion of the display.

In some embodiments, associating the first indication comprises embedding the first indication in the portion of the document to which the annotation relates. In some embodiments, embedding the first indication comprises: receiving location data related to the portion of the document; processing the location data to determine a first location within the document relative to a location of the portion within the document; and generating a new version of the document, the new version of the document containing the first indication embedded at the first location. For example, in some embodiments, the location data comprises one or more from the group comprising: a document identifier, a section identifier, a chapter identifier, a bookmark identifier, a portion length, and a portion offset.

In some embodiments, the invention also includes systems and methods for replacing a first version of the document stored in memory with the new version of the document, for example by overwriting a first version of the document with a new version of the document.

In some embodiments, receiving an annotation comprises receiving an annotation related to an image contained in the document, for example receiving information identifying one or more subjects of the image. In some embodiments, the system also includes methods for associating the one or more subjects with the image, such as by updating a data structure stored in memory, the data structure storing associations between one or more images and one or more subjects of the one or more images.

In some embodiments, the annotation comprises a commercial offer, such as an offer to purchase a product related to the document. In some embodiments, the system also includes methods for processing a request by a user at a client to purchase the product, such as methods for transmitting the product and the document to the user. In some embodiments, the system also includes methods for communicating, to a user at a client, an offer to purchase the document and a set of annotations related to the document, such as a set of annotations selected by the user. The system processes the user request to purchase the document and the set of annotations, for example by printing the document and the set of annotations. In some embodiments, for each annotation related to a portion of the document, the system prints the annotation and the related portion of the document on the same page. In some embodiments, processing the user request comprises transmitting the document and the set of annotations to the user.

In some embodiments, the system also includes methods for authenticating the user at a first client and authorizing the user at the first client to provide the annotation; and authenticating the user at the second client and authorizing the user at the second client to navigate the document.

In accordance with another aspect of the present inventions, the system includes methods to annotate content of a web page. An indication is inserted in and associated with content according to markup language describing offsets including a starting point and an endpoint for the indication, the starting point and endpoint offsets corresponding to a number of characters from a location within the content. In some embodiments, the system includes program code that captures user inputs identifying selections according to a paragraph identifier, a starting point value, and an ending point value. In some embodiments, the system enables a method for selecting an arbitrary string of characters on a web page and posting the selection, including related metadata, to an application server. In some embodiments, the related metadata includes positional metadata and content identifiers.

In one embodiment, the system enables a method for creating a custom memory book including original content supplied by a first party, annotations provided by one or more users, and multimedia elements provided by other users. For example, in some embodiments, users create a memory book by customizing existing content provided by content creators. In some embodiments, the original article also generally contains indications and corresponding annotations input by various users responding to the original article. A user can then create any number of custom memory books from the original article by uploading additional multimedia elements and selecting specific annotations to include in their personal memory book. In some embodiments, a user uploads their own personal pictures to replace or supplement the pictures in the original article posted by the content provider. In some embodiments, a user also uses pictures posted as annotations by other users to replace or supplement pictures of the original article or they use additional pictures provided by the content provider or other content providers. In some embodiments, users also select custom annotations to include with the memory book by filtering or otherwise selecting annotations from the set of annotations posted by other users regarding the original article. In one embodiment, a user automatically selects annotation from a list of friends who post annotations. In other embodiments, users select annotations individually or based on criteria such as ratings from other users or annotation type. In some embodiments, the system enables a method for printing and binding the custom memory book, such as by using standard book publishing equipment and techniques.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 5A presents an exemplary sample of code for an XHTML formatted page of content according to one embodiment of the invention;

FIG. 5B presents an exemplary sample of code for an XHTML formatted page of content according to one embodiment of the invention;

DETAILED DESCRIPTION OF THE PREFERRED EMBODIMENTS

Preferred embodiments of the invention are now described with reference to the drawings. As described further below, systems and methods are presented regarding a shared annotation system. A plurality of users collaborate or otherwise provide annotations and other input and feedback related to shared documents and content in a computer network. Users are able to synchronously navigate content via multi-portion displays in which indicators related to the annotations are embedded in document content in a first portion of the display and the related annotations are synchronously presented in at least a second portion of the display. In some embodiments, the system also generates custom documents based on annotated content, provides commerce opportunities related to annotated content, persistently presents selected multimedia content while navigating a plurality of document pages, and accepts and indexes annotations related to visual content elements such as graphics and photographs. Additional aspects and features of the system will also be appreciated by one skilled in the art as further described below.

Figure 1:
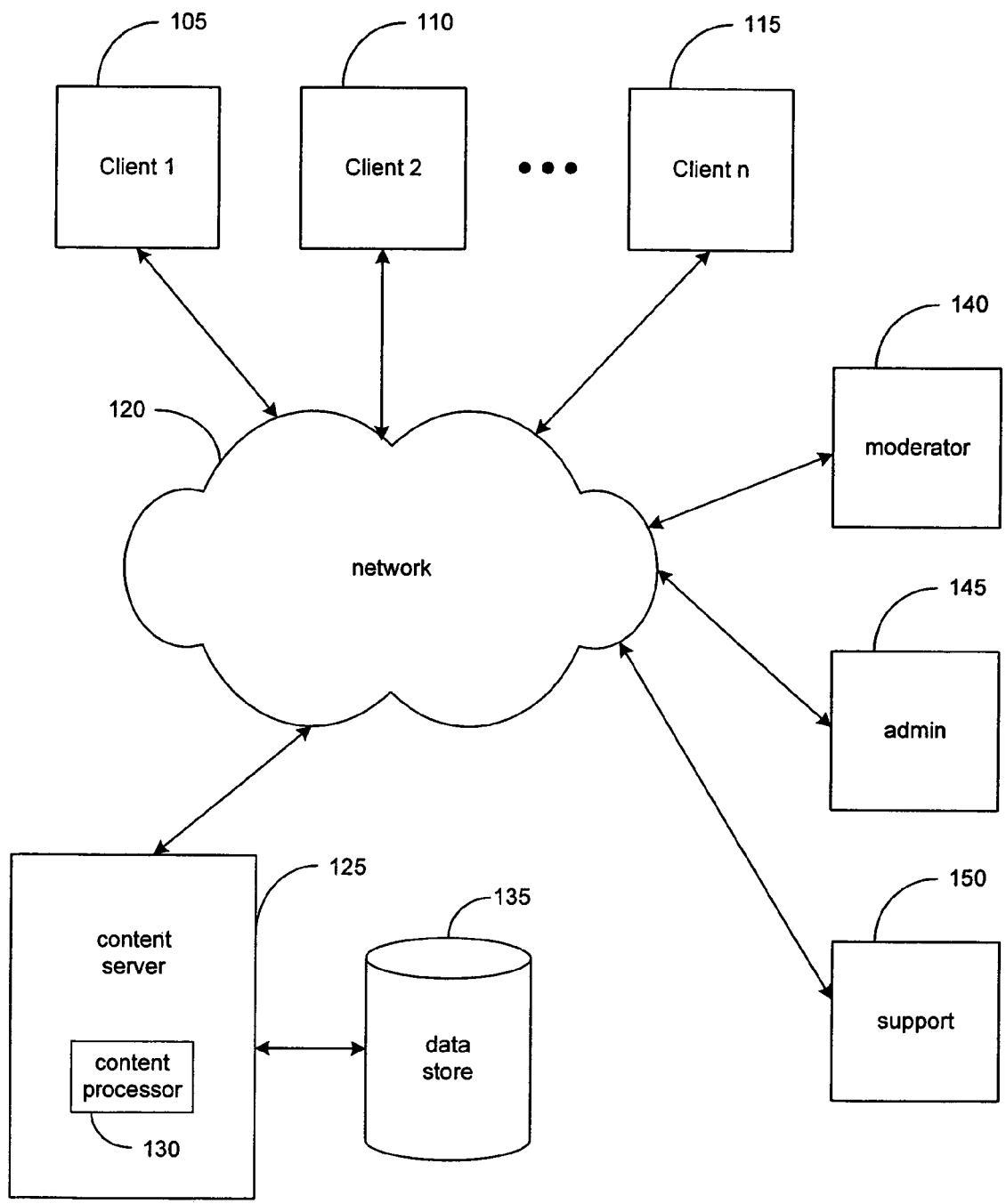
FIG. 1 is a block diagram of a shared annotation system according to an embodiment of the present invention.

FIG. 1 presents a block diagram of a shared annotation system according to an embodiment of the present invention. As shown, the system includes one or more clients including first client 105, a second client 110, and an nth client 115, connected to a network 120, a content server 125 including a content processor 130 communicatively coupled to a data store 135, and one or more additional computers including a moderator computer 140, an administrator computer 145, and a support computer 150. Clients 105, 110, and 115, and other computers in the system, including personal computers and other computing devices known in the art including personal digital assistants ("PDAs"), tablet computers, cellular telephones, and other devices. The clients are communicatively coupled to the content server 125 via a computer network 120, such as the Internet or a local area network ("LAN"). Users of the client's devices collaborate or otherwise provide annotations and other input and feedback related to shared documents and content in the network. The users collaborate or otherwise provide annotations regarding the content via one or more software modules including a display module. For example, in some embodiments users interact with content and provide annotations via a web browser, such as Microsoft Internet Explorer or Netscape Navigator.

The content server 125 contains a content processor 130 and other modules directed to receiving and processing user requests regarding content. Requests include annotations regarding content, requests for new content, navigation inputs regarding content, and other user requests. The content server 125 is communicatively coupled to a data store 135. The data store 135 stores a variety of data including document content for delivery to users, user account and registration information, annotations and other information generated by users regarding content, and other related data. As used herein, annotations generally include content-related input provided by users including text input, graphical input, audio input, video input, and other types of input, associated in some way with a particular selected character sequence in a primary set of content. For example, a user may input a textual comment or a user may upload a picture related to content. A user may also provide a voice recording or other recording related to content or even a video clip as an annotation. Annotations may also include a discussion group or other similar forum or means to facilitate threaded discourse or other interaction between users regarding a particular portion of a document. For example, a user may find a particular paragraph of a document very important and create a location-specific discussion group regarding the paragraph as an annotation.

Additional computers are also connected to the network 120 and interface with content server 125 and client computers to provide additional functionality. For example, moderator computer 140 may be used by a moderator to review and approve user comments and annotations. An administrator computer 145 may manage other aspects of user interaction with the system such as user registration or security related issues. Support personnel may use support computer 150 to interface with users and provide additional assistance or help regarding user concerns. Additional computers of remote clients may also be employed or used by role-based personnel such as a picture moderator, a comments moderator, a topic approver, a new edition creator, a discussion group moderator, etc.

Figure 2:
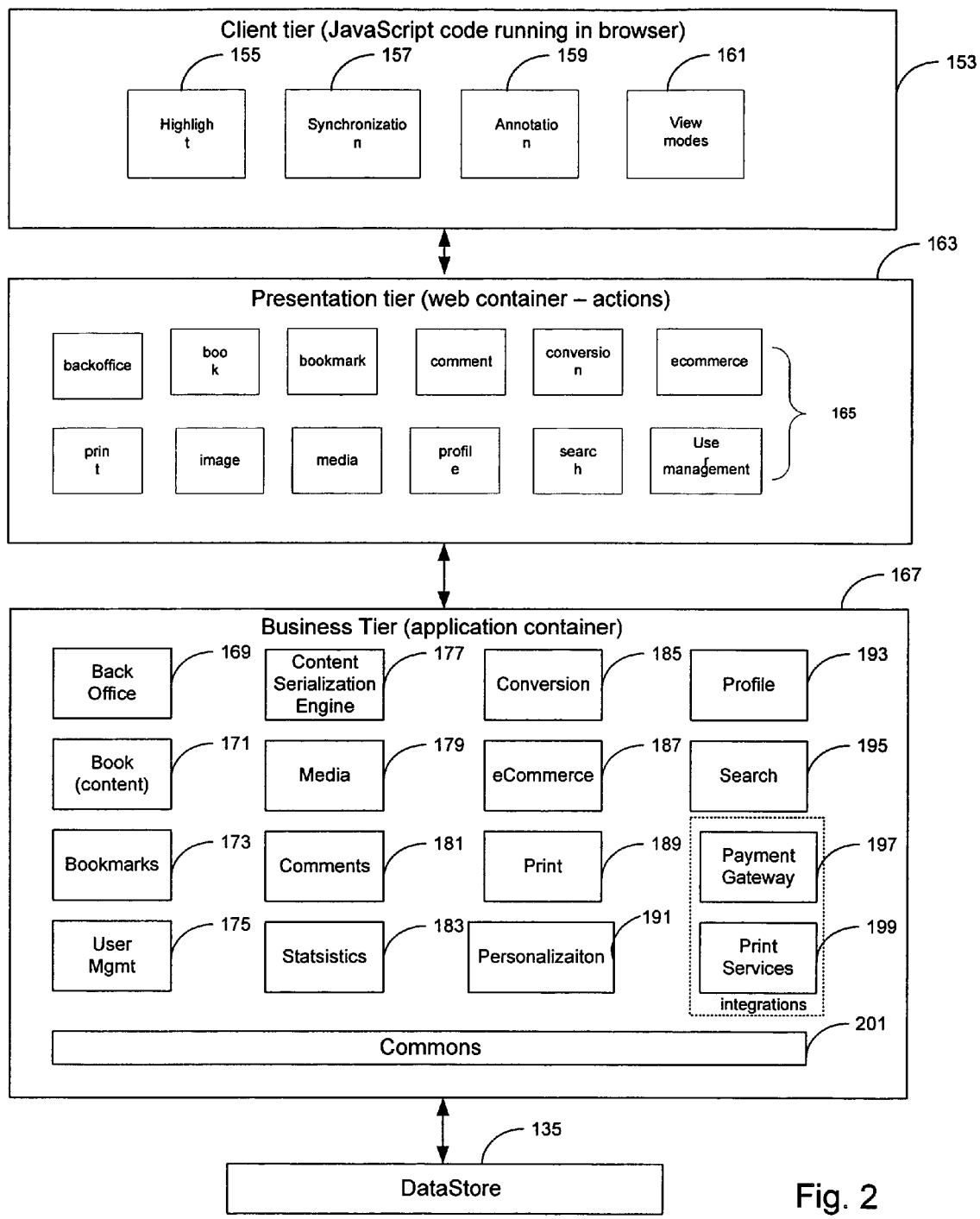
FIG. 2 is a block diagram of functional modules in a shared annotation system according to an embodiment of the present invention.

FIG. 2 presents a block diagram of functional modules in a shared annotation system according to an embodiment of the invention. The system is implemented using Model View Controller ("MVC") architecture as known in the art. Four tiers are presented including a client tier 153, a presentation tier 163, and an application tier 167, as well as a data store 135 or integration tier containing the data model. In some embodiments, modules are distributed among one or more content servers 125 and clients 105, 110, 115. The system may also implement multiple tiers and distribute modules to distribute functionality in order to improve system efficiency or otherwise load balance processing operations.

The client tier 153 includes a highlight module 155, a synchronization module 157, an annotation module 159, and a view modes module 161. The client tier includes code, such as JavaScript code, that executes on various pages, such as DHTML pages. The highlight module 155 is generally directed to managing selection and highlighting of annotations and text in the original content. For example, if a user clicks on an image annotation, the highlight module manages highlighting the corresponding text in the first portion of the display as well as the image annotation in the second portion of the display. Conversely, if a user selects or otherwise interacts with an annotation in the second portion of the display, the corresponding text or other visual elements are highlighted in the first portion of the display by the highlight module.

The synchronization module 157 manages relationships between original content in the first portion of the display and corresponding annotations in the second portion of the display. In the second portion of the display, annotations are presented corresponding to content in the first portion of the display as the user scrolls the first portion of the display. Similarly, when the user scrolls the second portion of the display containing annotations, the first portion of the display also synchronously scrolls ensuring that original content in the first portion corresponding to the annotations in the second portion is consistently displayed. The synchronization module 157 also prevents unnecessary scrolling which might cause flicker. For example, no scrolling is performed if an icon or other indication present in the first portion of the display corresponds to an annotation already visible in the second portion of the display. Thus, the second part of the display is scrolled to find the next annotation only when a navigation input changes the display such that an indication in the first portion of the display disappears and vice-versa.

The annotation module 159 generally manages and processes annotations of images and other multimedia content. For example, when a user selects a photo for annotation, the annotation module 159 presents a rectangular selection box over the photo that may be resized to precisely indicate the portion of the photo to which an annotation refers. Multiple selection rectangles or other selection shapes may be drawn over a photo each corresponding to individual annotations. Upon receipt of an appropriate input, for example when a save or post annotation(s) button is selected, the annotation module also handles communicating the selection input(s) and related annotation information to other modules of the system as further described herein.

The view modes module 161 generally manages and controls presentation modes for content. For example, the view modes module switches between modes such as "embedded mode" in which indications or icons are presented inline with original content, "non-embedded mode" in which indications are presented to the left of the original content with one indication type per paragraph, and "memory book mode" in which indications are aggregated by type and presented inline at the end of individual paragraphs as opposed to directly in the text or to the left of the text.

The presentation tier 163 generally includes a number of modules 165 running code within the web container. The code modules 165 generally include a controller responsive to data and inputs received from the client tier 163 as well as the business tier 167. Exemplary code modules 165 correspond to modules of the business tier 167 as further described herein and include a back office module, a book module, a bookmark module, a comment module, a conversion module, an ecommerce module, a print module, an image module, a media module, a profile module, a search module, and a user management module. Code modules 165 provide a bridge between application logic provided by the business tier and client inputs or presentation outputs.

The business tier 167 generally includes a number modules including a back office module 169, a book or content module 171, a bookmarks module 173, a user management module 175, a content serialization module ("CSE") 177, a media module 179, a comments module 181, a statistics module 183, a conversion module 185, an ecommerce module 187, a print module 189, a personalization module 191, a profile module 193, a search module 195, a payment gateway module 197, and a print services module 199. These various modules support a variety of internal administrative operations and actions, as well as process and respond to user actions in the presentation tier.

The user management module 175 is generally responsible for handling user-related operations such as registration, authentication, and membership rights and approvals (such as for administrators, regular members, etc.).

The book or content module 171 generally manages and directs content-related operations such as navigation to other pages and tracking user preferences. For example, the content module 171 tracks preferred viewing modes and last pages visited for users. Generally, the content module is not directly responsible for serving content, however, since this is handled and resolved in the presentation tier by the corresponding book code module of the presentation tier and other code modules for the sake of improved performance.

The bookmarks module 173 generally manages the user's private bookmarks list for content and annotations. For example, the bookmarks module 173 maintains a data structure containing pointers to locations for content or annotations that a user may wish to revisit or otherwise mark as a favorite. When an input is received selecting a bookmark, the system automatically navigates to and presents the related content or annotation corresponding to the selected bookmark.

The comments module 181 is generally directed to processing operations associated with posing annotations. For example, the comments module 181 manages inputs posting or replying to annotations, applying automatic moderation to posted annotations, and notifying moderators when annotations trigger various notification filters. In some embodiments, the comments module 181 also notifies annotation authors when a reply or other corresponding annotation is posted regarding their authored annotation. Similarly, media module 179 processes graphical annotations and other graphical information provided by users. For example, the media module 179 processes photo, video, and audio annotations processing posts and notifying moderators of certain posts, as well as managing user replies. In some embodiments, the media module also processes video annotations by capturing and presenting a particular frame (such as the first frame) as a thumbnail image representing the video in the annotations portion of the display.

The content serialization engine 177 interfaces with the database 135 to lock content, update content, and otherwise process user annotations. The CSE 177 facilitates content delivery among multiple users. For example, when a first user provides an annotation regarding a particular page of content, in some embodiments, synchronization module 165 locks that page and prevents access to the page by other users until the annotation process is complete. In some embodiments, the CSE 177 maintains a queue of new annotations and processes annotations by creating new content pages and media pages containing the new annotations as further described herein.

The statistics module 183 generally tracks data related to posted annotations. For example, in some embodiments, the statistics module 183 tracks the number of annotations posted for each page in a given document and presents an indication of which page has the most number of new posts or a certain number of posts within a given period of time, such as in memory book mode as further described herein.

The print module 189 is generally directed to printing or otherwise outputting content according to user inputs and preferences. For example, the print module 189 creates PDF files or other document files for versions of content output such as dynamic print and memory book creation as further described herein.

The conversion module 185 is generally responsible for processing and formatting raw original content for use by the system and for users to annotate. For example, the conversion module parses original content into paragraphs, formats the content for presentation, and creates bookmark IDs or other identifiers for each paragraph used by the CSE 177 to create new pages when annotations are added as further described herein.

The ecommerce module 187 processes payments and generally handles monetary transactions associated with use of the system. For example, the ecommerce module manages shopping carts and other purchase vehicles, processes credit card payments and other payments, and also interfaces with other modules such as integration modules including the payment gateway 197 and external print services 199.

The personalization module 191 and the profile module 193 are generally responsible for processing inputs regarding user accounts. For example, the profile module 193 processes user administrative requests regarding password and address changes. The personalization module 191, sometimes in conjunction with the profile module 193, handles other inputs such as associating a personal photo or icon to present next to user postings or in a user's business card, as well as other general information about the user such as hobbies, favorite websites, etc.

The search module 195 is generally responsible for indexing and processing search operations on both original text and on annotations. For example, search module 195 allows users to search not only document content, but also annotations provided by other users and other information. Users can search for annotations provided by a particular user, for a particular text string contained in annotations, and input other search expressions to locate information.

The system also includes various modules, such as a payment gateway module 197 and a print services module 199, for integration with external or third-party systems. For example, in some embodiments the payment gateway module 197 provides an interface to process all or part of the payments using a third-party payment provider. In other embodiments, the print services module 199 provides an interface for printing special jobs, such as hardcover book binding or other types of book creation of content, using a third-party or other external print services provider.

The business tier also includes a commons module 201. The commons module generally includes a utility library of various APIs and other system calls used for interfacing with the operating system, hardware components, the data store 135, modules in the various other tiers, etc.

Figure 3:
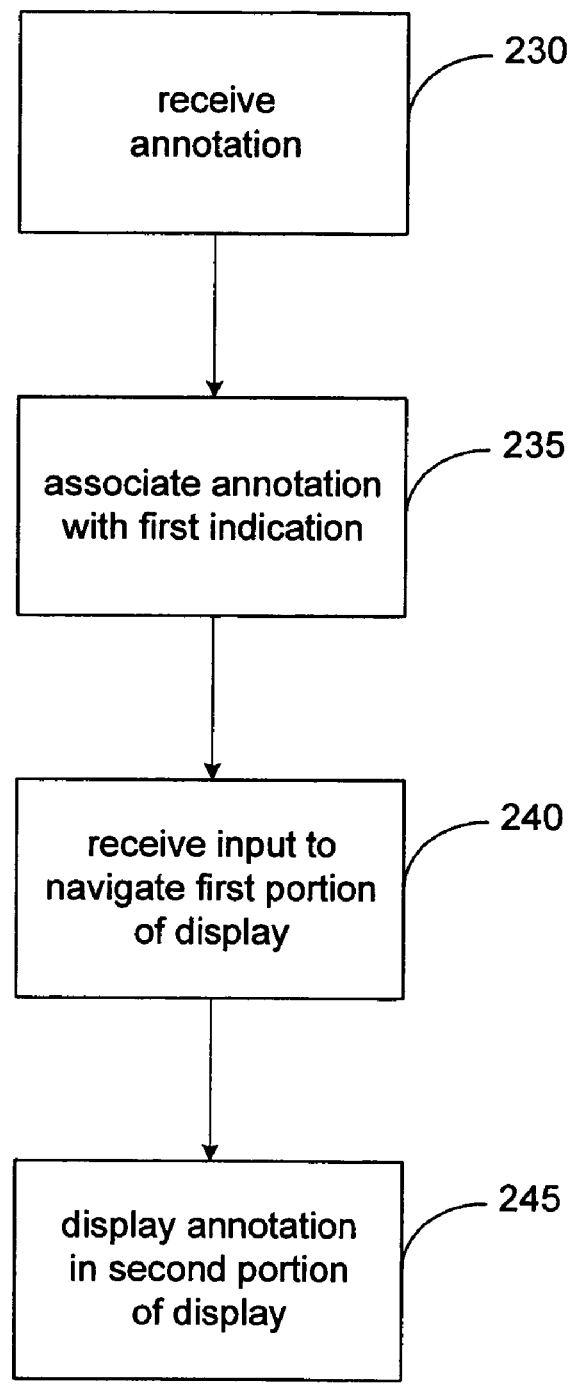
FIG. 3 is a flow chart of a method to synchronously navigate shared annotations according to an embodiment of the present invention.

FIG. 3 is a flow chart of a method to synchronously navigate shared annotations according to an embodiment of the invention. The system receives an annotation generated by a first user at a first client, step 230. For example, the system receives a text comment related to a document or a picture related to the document. The annotation is associated with a first indication, step 235. For example, the annotation may be associated with an icon or other indication embedded in the document. The system receives input from a second user at a second client to navigate a first portion of a display at the second client, step 240. The navigation input causes the first indication to be displayed in the first portion of the display at the second client. In response to the input, the system automatically displays the annotation in the second portion of the display at the second client, step 245.

Conversely, the system also processes and navigation inputs navigating the second portion of the display. Thus, the system also can receive an input from a second user at a second computer to navigate a second portion of a display at the second client. The navigation input causes the annotation to be displayed in the second portion of the display at the second client and, in response to the input, the system automatically displays the first indication in the first portion of the display at the second client.

In some embodiments, the system divides content into a plurality of pages. Thus, a book might be divided into chapters and each chapter formatted as a particular HTML or other similarly encoded page. The system loads an entire page of original content into the first portion of the display and also the entire page of related annotations for the page in the second portion of the display. In some embodiments, the system first loads only those annotations corresponding to indications immediately displayed upon loading the page into the first portion and then loads annotations corresponding to off-screen indications which achieves, among other benefits, a performance boost in terms of load times. As further described herein, code such as a JavaScript synchronization module monitors user navigation inputs and mouse inputs and states to determine whether and when to synchronously scroll or otherwise display indications and their related annotations in the first and second portions of the display.

For example, a JavaScript event or other similar program code returns identifiers corresponding to indications that are visibly displayed in the first portion. In some embodiments, the system employs a naming convention correlating indications with annotations. Thus an indication labeled I1 would have its corresponding annotation labeled A1 and an indication with an identifier of I2 would have its corresponding annotation identified as A2, etc.

When a navigation in put is received relating to the first portion of the display, the system determines, based on the JavaScript event data and indication identifiers, any indications visible in the first portion of the display and then automatically executes JavaScript code or other program code to display, in the second portion of the display, their corresponding annotations according to the naming convention. For example, if the system identifies indication I1 as visible in the first portion of the display, then it automatically executes code to display A1 in the second portion of the display. In some embodiments, when a number of indications are visible in the first portion of the display and there is insufficient screen space in the second portion of the display to display all of the corresponding annotations, the system, starting with the first indication displayed, displays as many corresponding annotations as possible in the second portion of the display.

In some embodiments, when a navigation input is received related to the second portion of the display, the system determines, based on the JavaScript event data and annotation identifiers, any annotations visible in the second portion of the display. The system also determines any indications visible in the first portion of the display as previously described herein. If the first portion of the display already shows the indication corresponding to the first annotation appearing in the second portion of the display, then the system does not redraw the screen. If the corresponding indication in the first portion is not displayed, then the system executes JavaScript code or other program code to display, in the first portion of the display, the indication corresponding to the first annotation appearing in the second portion of the display according to the naming convention. For example, if the system identifies annotation A1 as visible in the second portion of the display, then it checks if indication II is visible in the first portion of the display. If the indication is not visible, the system automatically executes code to display II in the second portion of the display.

Thus users at a plurality of clients are able to view content, as well as collaboratively annotate and view annotations provided by other users. For example, several users may negotiate a contract by sharing feedback and other annotations to produce a final version of the contract. The annotations would later serve as a record of positions regarding various clauses of the contract, how the document was created, who was in favor of various positions, etc. In some embodiments, the system also provides user authentication and secure access to content, allowing only a limited number of authorized users to access and/or annotate content. Thus, adverse parties are presented with a secure space in which they can collaboratively and synchronously annotate content. As another example, a school might post a number of photographs containing unidentified subjects. The system would provide a means for registered alumni or other parties to identify the subjects for the school archives, etc.

Figure 4A:
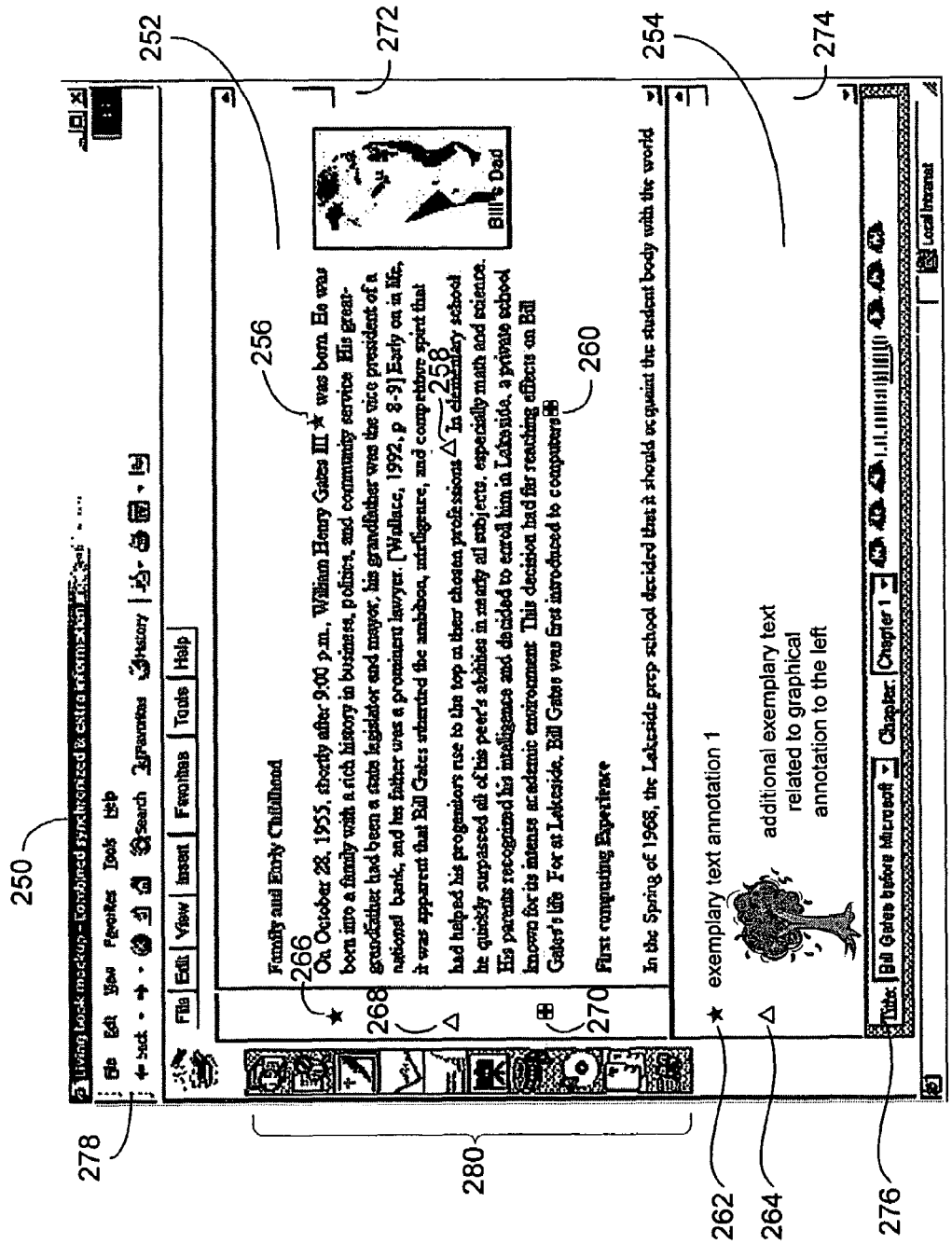
FIG. 4a is a block diagram of an exemplary screen display of a shared annotation system according to an embodiment of the present invention.

FIG. 4A presents a block diagram of an exemplary screen display of a shared annotation system according to an embodiment of the invention. A display 250, such as a browser display or other software application display, is divided into a first portion of 252 and a second portion 254. The first portion 252 contains information content provided by a server and the second portion 254 contains annotations related to the content in the first portion.

A user requests content from the content server and the content is delivered via the network to the user at a client and presented in the first portion of the display 252. Content may include, for example, the text of a book, graphical content such as a picture album or photo album, a proposed legal document or business agreement, multimedia content, or other types of content. For example, the text of a book appears in the first portion 252 of the display 250. Indications associated with user annotations are embedded within the content of the first portion of the display. Thus, indication 256 corresponding to user annotation 262 and indication 258 corresponding to user annotation 264 are embedded in the content of the first portion 252. The actual annotations 262 and 264 are presented in the second portion of the display 254.

In some embodiments the display 250 also includes a third portion 260 including additional references to indications contained in the first portion 252. For example, as shown, additional indications 266, and 268 corresponding to indications 256 and 258 are presented in a third portion of the display 260. Users can scan the third portion of the display 260 to quickly determine whether indications exist in the content presented in the first portion of the display 252.

The system also presents navigation interfaces such as scroll bars 272 and 274, as well as a menu bar 276 at the bottom of the display 250 which provides users with an interface to navigate a document divided into chapters/sections or jump to additional pages, etc. The system also presents standard interface elements such as final, edit, view, favorites, tools and help menus 278 as known in the art and common in Internet browsers.

In addition, the system presents a plurality of icons 280 designed to provide an interface for common operations that users might want to perform when viewing content such as a document, a photo album, or a book. Icons presented allow users to zoom in, zoom out, add a comment or annotation at a specific location within the content, highlight a specified region within the content, annotate a picture for a specified location, annotate video for a specified location, annotate audio for a specified location, create or interact with a discussion group related to the content at a specified location, perform a search, or resize the portions of the display.

Figure 4B:
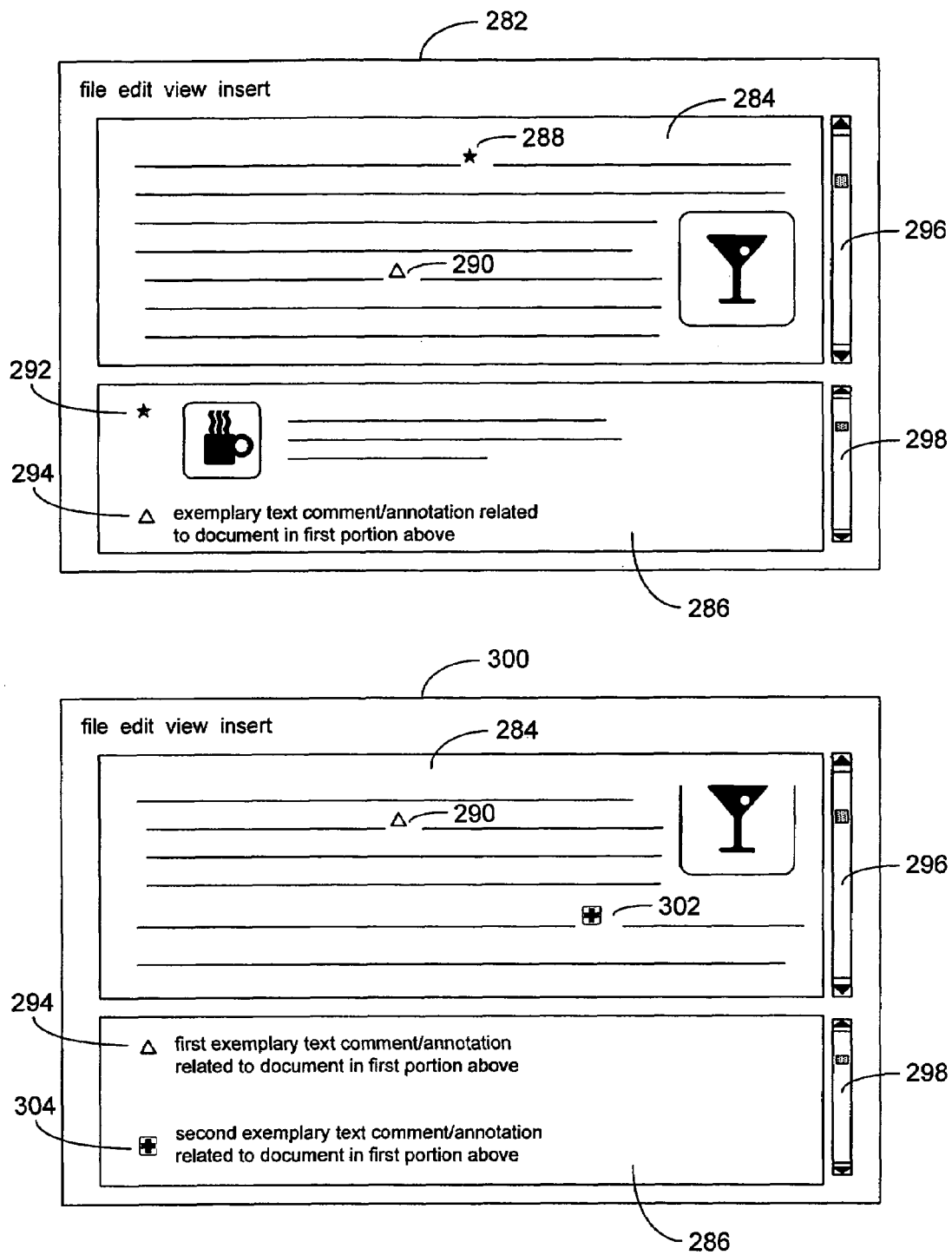
FIG. 4b is a block diagram of two exemplary screen displays of a shared annotation system according to an embodiment of the present invention.

FIG. 4B presents a block diagram of two exemplary screen displays of a shared annotation system according to one embodiment of the invention. The two screen displays 282 and 300 show versions of the same display at two different points in time. The display is divided into a first portion 284 and a second portion 286. The first portion contains content as well as indications 288 and 290 associated with user annotations 292 and 294 respectively. Navigation means, such as scroll bars 296 and 298, are also provided.

As previously described, a user navigating the display 282, for example, by using slider 296, would cause the display 282 to change as shown in a second screen display 300 of the same display at a later point in time after the system processes the navigation input. The user scrolls the content in the first portion 284 such that indication 288 disappears from the first portion 284 and indication 302 appears. Similarly, annotation 292 associated with indication 288 automatically disappears in the second portion 286 of the display 300 and annotation 304 corresponding to indication 302 automatically appears in the second portion 286. As previously discussed, the system also conversely scrolls content in the first portion 284 of the display 282 when a user navigates content in the second portion 286 of the display 282. For example, the system automatically scrolls content in the first portion 284 of the display 282 according to a user input, such as a scroll bar slider 298 or other similar means, to navigate annotations in the second portion 286 of the display 282. Thus, an indication 288 corresponding to an annotation 292 in the second portion 286 of the display 282 would automatically appear or disappear in the first portion 284 of the display 282 when the corresponding annotation 292 appears or disappears in the second portion 286 of the display 282 according to a user navigation input.

Figure 5:
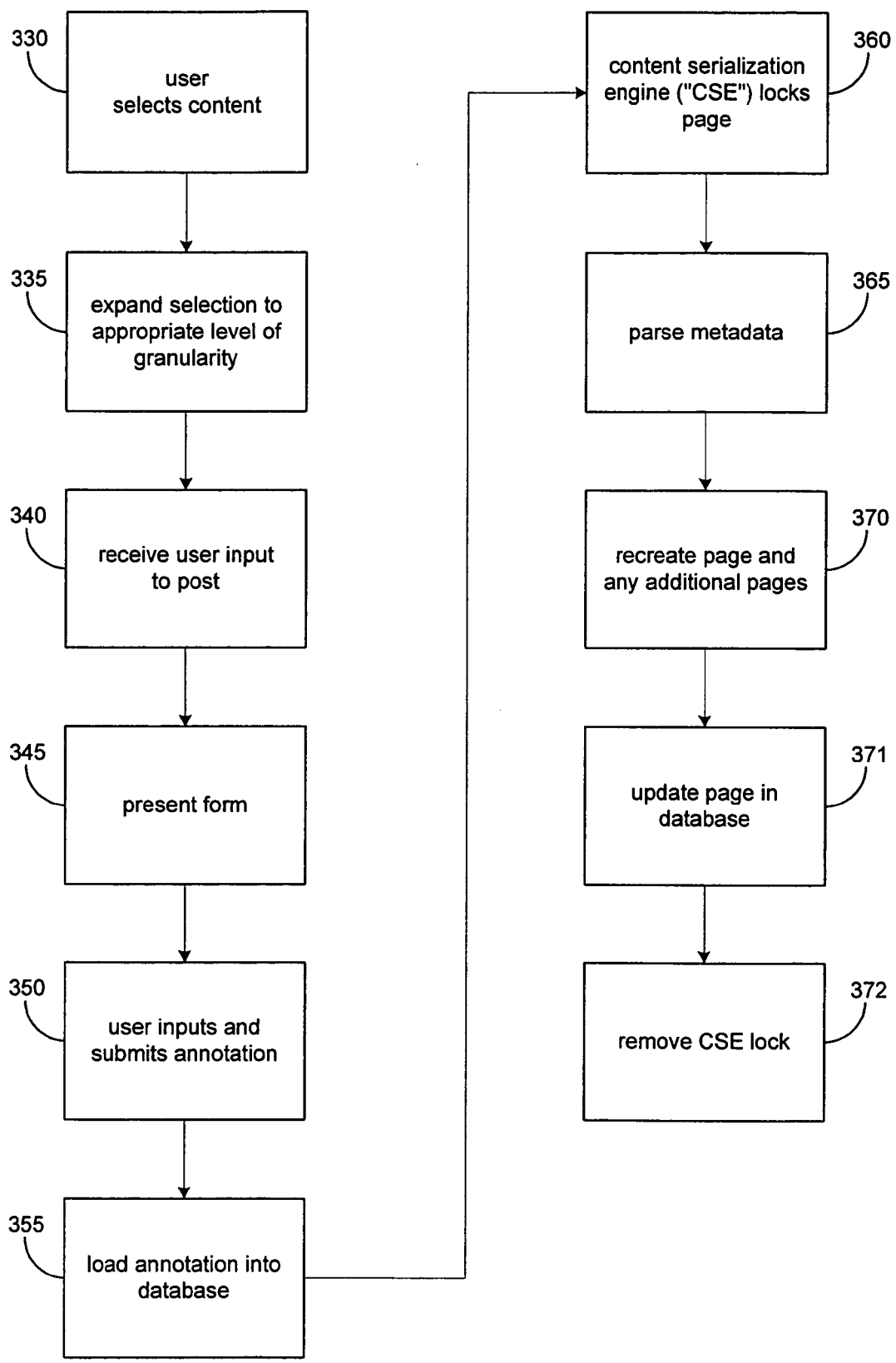
FIG. 5 is a flow chart of a method for processing an annotation according to an embodiment of the present invention.

FIG. 5 presents a flow chart of a method for processing an annotation according to an embodiment of the present invention. A user selects content via a selection tool or other means, step 330. For example, a user might employ a text tool to highlight and select several words in the text of a document which the user wishes to annotate with a textual comment, an uploaded picture, a video, a sound recording, etc. JavaScript event code or other program code related to mouse inputs and other user inputs captures various metadata regarding the user selection. For example, the event code captures and returns a unique paragraph identifier tag, a starting point value or offset (in characters from the start of the identified paragraph, pixels, or other metrics known in the art), and ending point value or offset.

While the example discussed herein with respect to FIG. 5 relates to processing a text selection, those skilled in the art will recognize that the process could similarly apply to selecting other forms of multimedia content including pictures, video, etc. For example, in one embodiment a user can crop one or more areas of a picture the user desires to annotate. For example, a user could crop a single area of a picture for an annotation or a user could crop several different (or overlapping) areas of the same picture for several different annotations. The user selects the area using a rectangular cropping tool. The system captures the x,y coordinates of the corners of the rectangle to create a mapping or overlay representing the selection of the original image. Once the image area is selected the user may also assign additional attributes to the selection (such as a person name, a product identifier, a price, a location, a theme, a date, etc.). In some embodiments, users may also indicate a frame or other location in a video using similar selection means for individual frames of a video.

The system expands the selection to an appropriate level of granularity, step 335. A user might select several letters of a word and the system might expand the selection by highlighting the entire word. In some embodiments, for example to preserve system resources or to limit annotations from cluttering a screen or for other design-related considerations or specified goals, the system imposes a pre-set limit on the ability of a user to annotate text to a certain level of granularity. Thus a user may only be able to annotate whole words or only words at the end of a sentence. For example, if a user were able to annotate every individual letter of words in a text, a single word such a "Kennedy" might have as many as seven distinct indications (corresponding to the total number of letters in the word) presented with the word. This would likely render display of content in the first portion of the display extremely cumbersome and severely limit the ability of the system to efficiently present information to users.

Similarly, the system may also limit the number of indications presented related to particular sections of text or other content. Indications may be consolidated or combined in the interest of making content more readable, visually comprehensive, or otherwise accessible. For example, annotations provided by four different users might be associated with a single indication embedded in the content and displayed in the first portion of the display rather than with four separate indications in the first portion. In the second portion, however, each individual annotation provided would automatically be displayed when its corresponding indication is presented in the first portion of the display.

After the user selects the desired content, the user indicates its desire to post an annotation related to the selected content, step 340. For example, a user may select a section of text and then click a "post" button or icon. The system presents a form or other similar input mechanism, step 345, which allows the user to input and submit/upload the desired annotation to the content server, step 350. For example, a form window may open allowing the user to input a text annotation or a tree-view directory structure may be presented allowing the user to select a file (such as a picture, a video, an audio clip, etc.) to upload as an annotation.

The annotation input by the user and any related metadata are then uploaded via the network to the content server and stored in the data store for further processing, step 355. The system generally communicates metadata indicating, among other things, the desired position of the annotation within the content of the first portion, the user's identity, the type of annotation, etc. For example, in one embodiment, JavaScript code captures the events of a mouse click indicating the beginning of a selection, mouse drag changing the x,y coordinates for the selection, and a mouse up or un-click ending the selection. This data is saved into an HTML form attribute and transmitted to the server when the form is submitted. In some embodiments, as further described herein, the system also indicates the position of a desired annotation by providing metadata indicating an offset from a particular starting point within the document content and a selection length corresponding to the user selection of steps 330 and 335. For example, if a user selects text several sentences into a paragraph or other arbitrary section of a document, the system may communicate metadata indicating, from the start of the paragraph or other section, an offset corresponding to the number of characters at which the annotation begins and a length corresponding to the number of characters selected for the annotation.

In some embodiments, the system uses a content serialization engine ("CSE") or other similar means to lock the page of the document to which the annotation relates, step 360. In some embodiments, this prevents multiple CSEs from accessing and updating the page at the same time. For example, in a parallel processing environment or other environment supporting multiple CSEs in the same system, each CSE locks an individual page prior to updating the page to prevent other CSEs from accessing and simultaneously updating the page which would create problems such as content synchronization, etc. In some embodiments, the CSE lock also prevents other users from requesting the page from the content server while the system is processing the user's submitted annotation and embedding a related indication in the page of the document.

As discussed, the system parses the metadata associated with the annotation, step 365. Using the length, offset, and other data provided with the metadata, the system determines a location in the document content at which to embed an indication corresponding to the annotation. The system then recreates the original page (including any additional pages created by the annotation) to embed an indication corresponding to the annotation, step 370, and updates the database with the new page, step 371. In some embodiments, the system replaces the old page stored in the database with the new page. In other embodiments, the old page is retained in order to track document versions and related annotations. The CSE lock is removed, step 372 and users at other clients are then able to request, retrieve, and view the new page containing the new indication corresponding to the new annotation.

FIG. 5A presents an exemplary sample of code for an XHTML formatted page of content containing an indication corresponding to an annotation which would be presented in the first portion of a display according to one embodiment of the invention.

The code sample uses various XHTML elements such as Div elements, Span elements, Highlight elements, and Content elements to present the content and corresponding indication.

Div element class shrdbk_main 373 is a div element that wraps the whole book text. In some embodiments, this element is used in a non-embedded mode to separate the indications or book items icons from the page text/content. Thus, a user would be able to toggle presentation of content both with and without indications being displayed.

The system also uses a number of different types of Span elements. Span elements are tags generally used to group inline elements in a document. Span element shrdbk_start-_element 374 is a span element that is used as an indicator for the start location of the related text of the book item. The id attribute contains the type of the book item or indication ('C.' for comment, 'I' for image, 'A' for audio and 'V' for video), an identifier for the indication, and a starting location of this element in a numerical representation corresponding to a number of characters or other metric (e.g.__554). The indication identifier is used in varying embodiments to distinguish between indications and also to assist in content navigation, for example if a user wishes to jump to the next indication, etc.

Span element shrdbk_end_element 375 is a span element that is used as an indicator for the end location of the related text of the book item or indicator. The id attribute contains the type of the book item, the book item id, and a location or offset of this element in a numerical representation (e.g. _681).

Span element shrdbk_icons 376 is a span element that contains the image of the icon or indication to be embedded. For each location in the content, such as the book text, a different type of indication icon is used to represent each different type of annotation (e.g.—text annotation, multimedia annotation, etc.). The image element that is included for the indication represents the type of the items and the index number of the first item at this location, according to its appearance order within the book text.

Highlights Div elements idYellow, idFirstLine, and idLastLine 377 are a set of div elements that are used for highlighting the related text corresponding to the annotation. For example, when a book item is selected, by clicking on its title, the text range that represents the related text is located according to the start and end span elements. Text rectangles are created from the given text range and these div elements positions are set according to the text rectangles.

For each shrdbk_icons span element there is also a corresponding div element, Content Div 378, which includes a representation of each of the item(s) that the span element contains for the specific location. This div element is generally displayed when the mouse cursor is over the image icon. The div element contains links for the related text of each of the book items and when clicking on those links the related text is highlighted. In some embodiments, another role of those links is to synchronize the media area/first portion with the current viewed item. Thus, when the user clicks on one of the links except from the highlighting of the related text, the media area automatically scrolls to the appropriate item in the second portion of the screen. In some embodiments, if the current displayed items have a different type from the item that was clicked, the type of the viewed media is changed to the equivalent type according to clicked link.

FIG. 5B presents an exemplary sample of code for an XHTML formatted page of content containing an indication corresponding to an annotation which would be presented in the first portion of a display according to one embodiment of the invention.

The code sample also uses various XHTML elements such as Div elements, Span elements, Highlight elements, and Content elements to present the content and corresponding indication. More specifically, the code sample provides exemplary span elements for presenting content in embedded and non-embedded modes.

For example, span elements 379 are used for displaying icons and other content in non-embedded mode. The element at the beginning of the paragraph is used as an anchor for the book item icon. The content element is placed in the bottom of the HTML document and includes the book item title as well as any relevant functionality.

Span elements 380 are used for displaying icons and other content in embedded mode. Here, the element within the paragraph is used as an anchor for the book item icon. The content element is similarly placed in the bottom of the HTML document and includes the book item title as well as any relevant functionality.

In addition, Span elements 381 present exemplary uses of span elements as start and end anchors for highlighting selected or annotated content.

Figure 6:
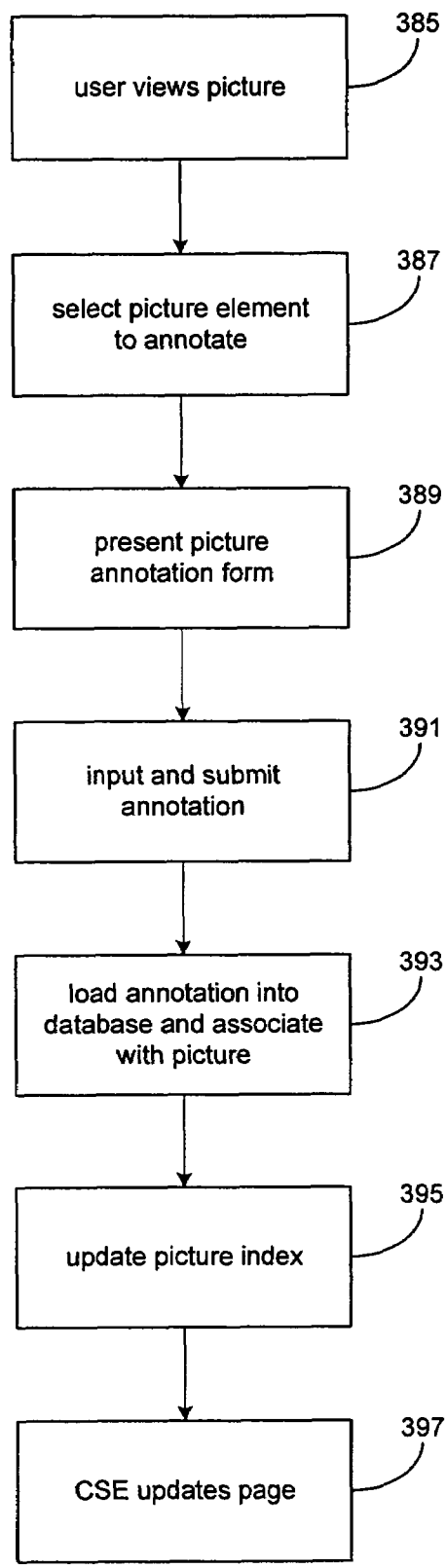
FIG. 6 is a flow chart of a method of annotating a visual element according to an embodiment of the present invention.

FIG. 6 presents a flow chart of a method of annotating a visual element according to an embodiment of the present invention. In some embodiments, users may wish to provide annotations corresponding to visual elements such as pictures or video clips. Thus, the user views a visual element, such as a picture, step 385, and selects a picture element to annotate, step 387. As discussed, in some embodiments, the user might use a selection tool to crop or otherwise select picture elements, for example, by drawing a box around or otherwise selecting a person in a photo.

The system then presents an annotation form or other input means, step 389, and the user inputs and submits the annotation, step 391. In some embodiments, the system allows the user to submit multiple annotations for a single picture. Thus, in these embodiments, control may return to step 387 for the user to select additional picture elements. For example, the user may select a first element and input an annotation for the first element and then select a second element and input a second annotation for the second element, etc. The annotation (s) are then uploaded via the network to a content server and stored in a data store where they are associated with the visual element(s), step 393. In some embodiments, the system also maintains and updates an index of annotations corresponding to visual elements, step 395. For example, users may provide annotations identifying subjects in visual elements and the system maintains an index of identified subjects cross-referenced with their corresponding visual elements. Using search means known in the art, users could access such an index to locate all visual elements in a content document, such as a photo album, a book, etc., in which a particular subject appears. The content serialization engine then locks the page, embeds any required indications in the original content as previously described herein, and updates the original page in the data store as previously described herein, step 397.

Figure 6A:
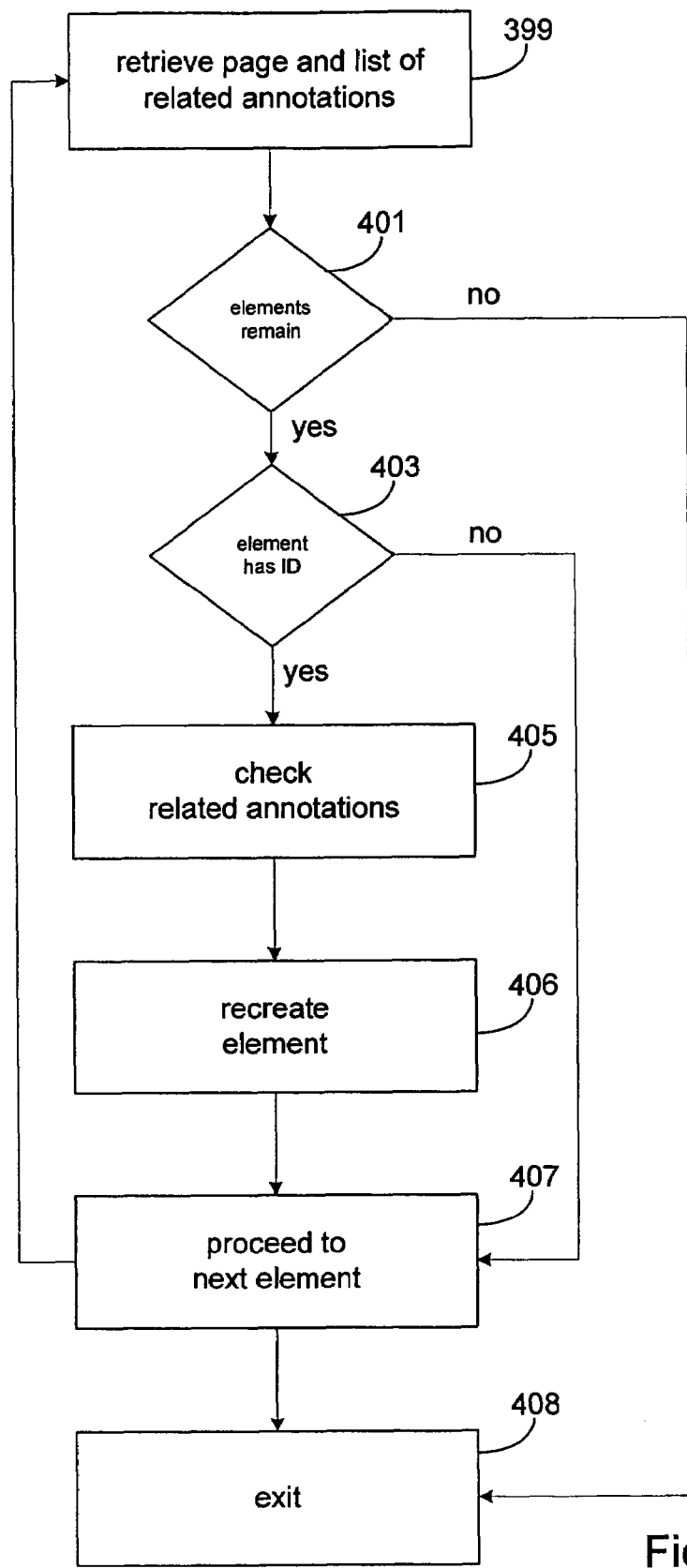
FIG. 6A is a flow chart of a method of recreating a page of content according an embodiment of the invention.

FIG. 6A presents a flow chart of a method of recreating a page of content according an embodiment of the invention. Once the content serialization engine locks the page, the system retrieves the existing page from the data store and a list of all related annotation to content and indications of the page, step 399. The system determines if any elements of the page remain to be processed, step 401. For example, content generally comprises various XML tag elements corresponding to user selections and other content related to annotations. In one embodiment, the CSE organizes elements into a list corresponding to their location on the page. If no further elements remain to be processed, control proceeds to step 408 and the routine ends.

Otherwise, the system determines whether the next element in the list is associated with a content identifier, step 403. For example, in one embodiment, the system determines whether the element has a sharedbk XML tag identifier. If the element does not have an identifier, then it is generally not associated with an annotation and recreation of the element is generally not required and thus control passes to step 407 and the system proceeds to process the next element in the list.

Otherwise, the system checks for annotations related to the element, step 405, and recreates the element, step 406 as further described herein. For example, in some embodiments, elements associated with annotations are associated with unique content identifiers. Thus, an element and all its related annotations might share the same or related content identifiers according to embodiments of the invention. After the system determines which annotations relate to the current element, the system recreates the element, step 406, inserting any necessary indications, rollovers, or other items as further described herein.

Figure 6B:
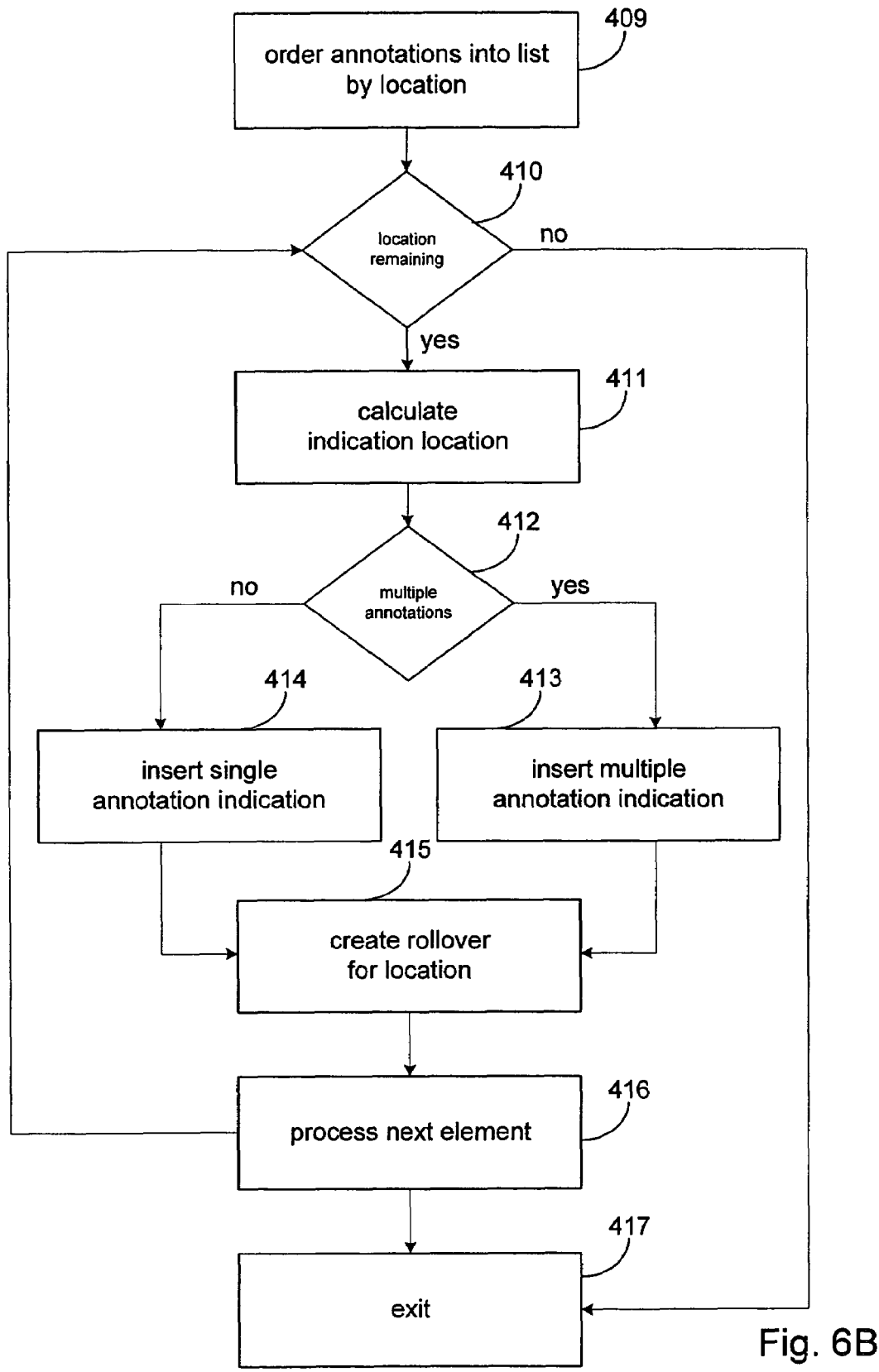
FIG. 6B is a flow chart of a method of processing an element during page creation according to an embodiment of the invention.

FIG. 6B presents a flow chart of a method of processing an element during page creation according to an embodiment of the invention. After the system determines that an element should be recreated (or in some embodiments originally created), the system orders all annotations associated with the element into a list according to their location, step 409. Thus, for a particular sentence, paragraph, page, etc. the system creates an ordered list of all annotations using the offsets and location metadata stored with the annotations. If no further annotations remain to be processed, control passes to step 417 and the routine exits. Otherwise, the system processes the location metadata associated with the annotation to determine the location in the first portion of the display to place an indication or icon corresponding to the annotation in the second portion of the display, step 411.

The system processes the annotations in the list to determine whether there are multiple annotations associated with the same location, step 412. If there are multiple annotations, then the CSE creates the XHTML code or other code, inserting a multiple annotation indication or icon, step 413. If there are not multiple annotations, then the CSE creates the XHTML code or other code, inserting a single annotation indication or icon, step 414. For example, in some embodiments, certain indications indicate that they correspond only to a single annotation. An image indication corresponds to an image annotation, an audio indication corresponds to an audio annotation, etc. In other embodiments, if multiple annotations are made at the same location in the original content in the first portion of the display, the system embeds or otherwise places a multiple annotation indication which indicates that more than one annotation has been made at a particular place in the original content.

In some embodiments, the CSE also creates XHTML code or other code, generating a rollover action associated with the indication, step 415. For example, the CSE engine retrieves metadata associated with the annotation(s) for a particular location and indication which lists a title for the annotation, the annotation's author(s), etc. The system then proceeds to process the next element, step 416 and control returns to step 410.

Figure 7:
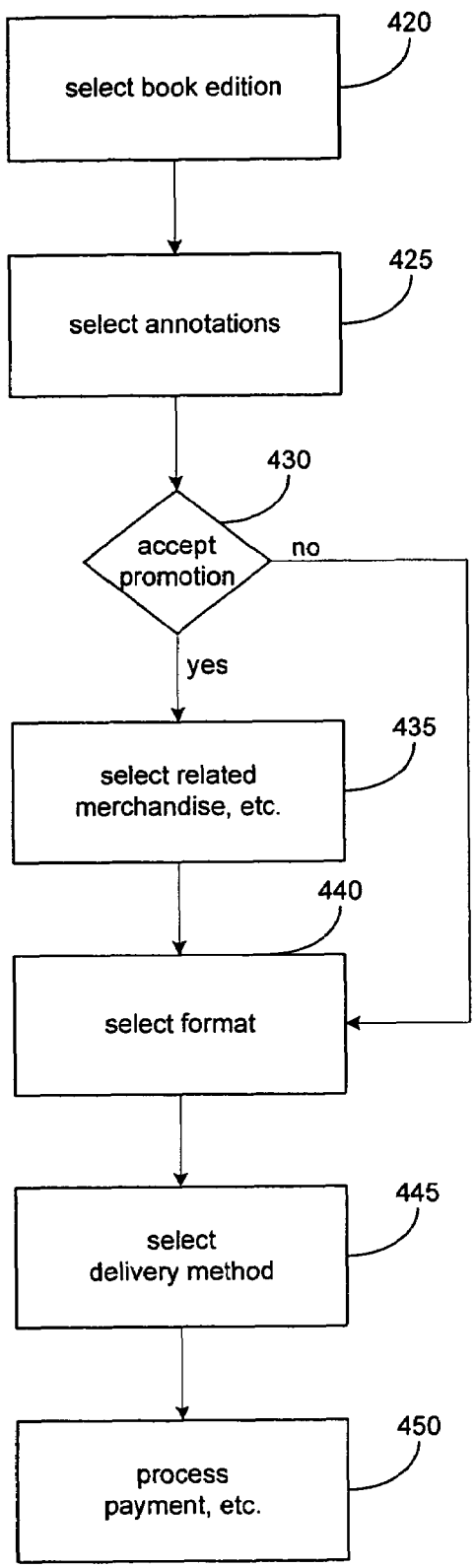
FIG. 7 is a flow chart of a method of providing a customized document related to a shared annotation system according to an embodiment of the present invention.

FIG. 7 presents a flow chart of a method of providing a customized document related to a shared annotation system according to an embodiment of the present invention. A user may view a book on home repair in which the main document content of the book provides chapters on framing, wiring, plumbing, etc. Within each chapter, other users may have provided annotations related to various tasks described, etc. One user might indicate a particular brand of pipe that they found useful in completing a certain project or a particular type of light fixture well-suited to applications. Another user might provide additional photographs of their project with additional text comments, etc. to supplement the information of the original book. Thus, users may wish to view and wish to purchase or otherwise obtain customized documents, including these related annotations and other items such as tools required to complete certain projects, etc.

Figure 8:
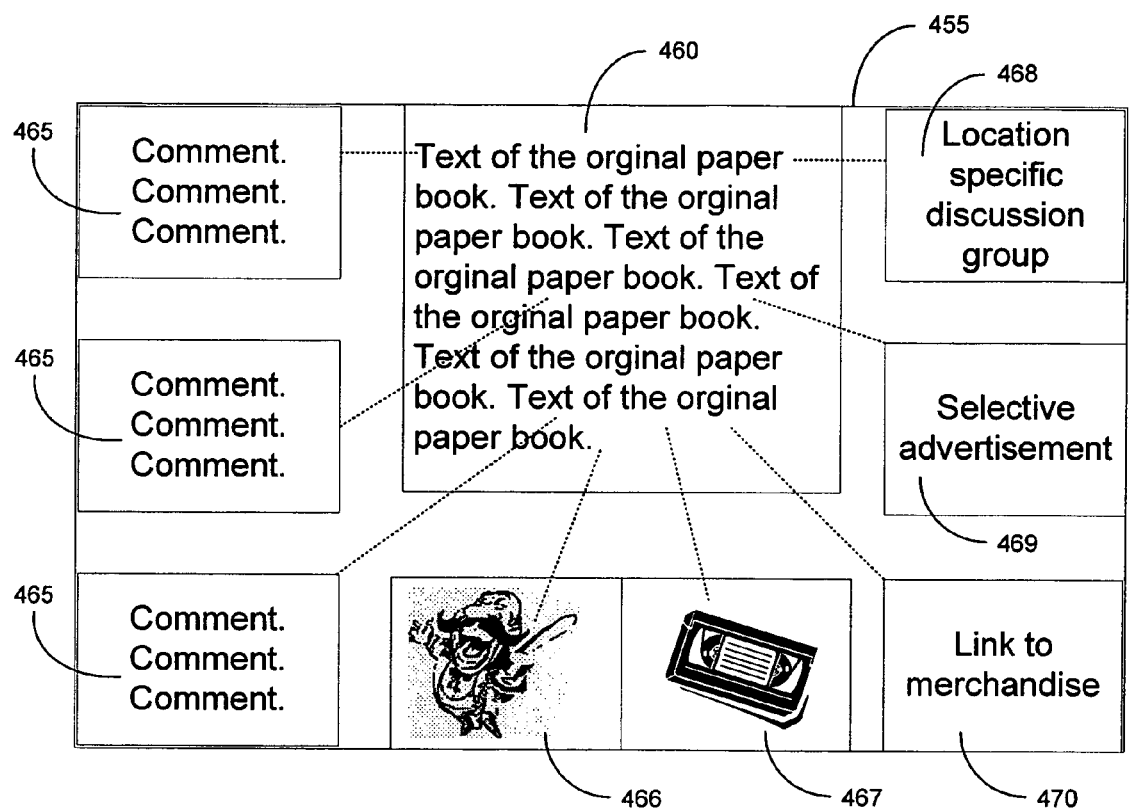
FIG. 8 is a block diagram of a sample page from a customized document related to a shared annotation system according to an embodiment of the present invention.

For example, as shown in FIG. 8, a block diagram of a sample page 455 from a customized document according to an embodiment of the present invention is presented. The sample page 455 includes the document content 460 corresponding to the content of the document presented in the first portion of the display. In some embodiments, the page 455 also includes annotations and other comments related to the document content 460 such as textual annotations 465, picture annotations 466, audio or video annotations 467, annotations related to discussion group content 468, advertisements 469, links to related merchandise 470, and other information. Those skilled in the art will appreciate that this information could be presented in a variety of manners or layouts. For example, as shown in FIG. 8, the document content 460 is centrally displayed and surrounded by related annotations including callouts to indications contained in the content 460 and other visual cues.

Thus, returning to FIG. 7, the user selects a particular book edition, step 420. A user may select among a number of different books or documents containing content related to a desired subject or a user may only select certain chapters within a book. For example, a user may consult a home repair manual, but only be interested in the chapter on plumbing or on wiring and not wish to be provided with the entire book.

The user also determines and selects annotations they wish provided with their customized document/book, step 425. A user may wish to be provided with all annotations related to the desired content, only annotations authored by an arbitrary/particular user, only a specific annotation containing certain information the user finds useful, such as supplemental photos, video, other types of annotations, etc. In some embodiments, the system also offers the user a promotion or other offer associated with the content and the user determines whether or not to accept the promotion, step 430. Thus, a user purchasing a home repair manual chapter related to dry walling might also be presented with the option to purchase items and merchandise related to the project such as hammers, nails, screws, plaster, tape, drywall, or even other books or information related to the project. For example, the system may also offer a video of how to complete a sample project for an additional premium.

If the user accepts the promotion or offer, the user selects the related merchandise or otherwise complies with responding to and accepting the offer, step 435. Otherwise, control passes directly to step 440 and the user selects a particular format for the customized document.

For example, a user may wish a hardcopy paper version of a customized document or they may prefer to receive the document electronically or some combination thereof. As necessary, the user also selects a delivery method, such as via mail, express mail, download, etc., step 445. The user also inputs any necessary payment information, personal information, registration information, license information, or other information required to complete and process the transaction, step 450.

Figure 8A:
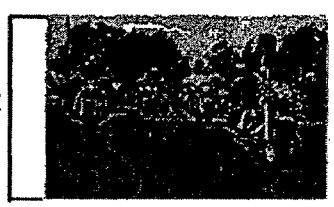
FIG. 8A is a screenshot of an exemplary article page of a memory book according to an embodiment of the present invention.
Figure 8A:
Figure 8A:

FIG. 8A resents a screenshot of an exemplary article page of a memory book according to an embodiment of the present invention. A memory book generally comprises a customized printout of content and related annotations. In some embodiments, memory books are compiled and bound according to user preferences.

For example, in some embodiments, users create a memory book by customizing existing content provided by content creators. Thus, for example, a content provider might use the system to post an original article to the Web containing text, photos, and other multimedia elements recounting or otherwise related to an event such as a Harley Davidson rally or a Britney Spears concert. The original article also generally contains indications and corresponding annotations input by various users responding to the original article. A user can then create any number of custom memory books from the original article by uploading additional multimedia elements and selecting specific annotations to include in their personal memory book. For example, a user attending the Harley Davidson rally can create a memory book containing photos, annotations, and other elements related to that user's own personal experience at the Harley Davidson rally. As another example, a user attending the Britney Spears concert creates a memory book related to their own personal concert experience with their own photos from before the show, after the show, photos from during the show, related annotations, the user'own textual inputs, etc.

For example, a user who went to the Harley Davidson rally uploads their own pictures taken at the rally to replace or supplement the pictures in the original article posted by the content provider. In some embodiments, a user also uses pictures posted as annotations by other users to replace or supplement pictures of the original article or they use additional pictures provided by the content provider or other content providers.

Users also select custom annotations to include with the memory book by filtering or otherwise selecting annotations from the set of annotations posted by other users regarding the original article. In one embodiment, a user automatically selects annotation from a list of friends who post annotations. In other embodiments, users select annotations individually or based on criteria such as ratings from other users, annotation type, etc.

Thus, a user creates their own personal memory book from the original article. The personal memory book generally contains the text and other content of the original article including additional pictures, text, videos, and related annotations selected or otherwise input by the user. As further described herein, the user then has the option to print out the memory book and have it bound or otherwise preserved, for example as a souvenir.

An article page of a memory book generally includes article text of the original content along with embedded photos with captions, embedded indications, and other items as further described herein. Generally, the presentation of the article page is formatted as closely as possible to the view a user would be presented with online. In some embodiments, however, the pagination is different since the content is now being produced on a printed page as opposed to on a display. Indications and other content elements, however, are generally presented in the same location within the content as they are presented in a display, thus enabling users to quickly reference between online and printed versions.

The article page includes one or more of the following: a header 471, embedded images 472, image captions 473, embedded icons or indications 474, and a footer 475. The header 471 generally remains consistent across pages throughout a memory book, thus unifying content presentation, etc. In some embodiments, the header includes a graphic, such as a logo, and heading text which may be used by the system to create a table of contents, an index, etc. Embedded images 472 include images originally presented in the original content as well as images selected by a user for inclusion in the memory book. For example, a user creating a memory book of a trip might select only particular photos from a set of photos for inclusion within the memory book. In some embodiments, images 472 also contain an image caption 473 which may include the poster's username, the date the photo was posted, a title for the image 472, etc. Embedded icons or indications 474 generally appear in the same location of the content as they do when presented in a display. In some embodiments, however, icons 474 are renumbered for each individual page (e.g.—starting from 1 for the first indication 474 on each page) and thus the numbering scheme for indications 474 may differ from the online version of the book. In some embodiments, the article page also contains a footer 475 containing the book's title, page number, publisher information, etc.

Figure 8B:
FIG. 8B is a screenshot of an exemplary comments page of a memory book according to an embodiment of the present invention.

FIG. 8B presents a screenshot of an exemplary comments page of a memory book according to an embodiment of the present invention. The comments page of a memory book generally includes comments and other annotations input by users online and generally is included on one or more separate pages falling after the article page as opposed to on the same page as the article text itself. The article comments page includes one or more of the following: a header 476, a sub-header 477, a comment or reply icon 478, a comment title 479, a username and date of post 480, a comment text or other annotation content 481, one or more replies 482, and comments by various types of members 483.

The header 476 of the article comments page is generally a graphic and corresponds to the header of the article page of the memory book. Sub-headers 477 indicate the printed page in the memory book which contains the article to which the annotations are related. Comments or reply icons 478 are generally graphics indicating a type of comment. For example, a text comment might have a balloon with text in it as an icon 478 and an audio comment might have a musical note as an icon 478. Comment titles 479 indicate any heading a user inputs to associate with their comment. In some embodiments, comment titles are printed in different colors according to the type of user. For example, comments by regular members might be printed in black, comments by moderators 482 in red, etc. In some embodiments, comment text 481 is also displayed in varying colors according to user types. In some embodiments, a username and date of post 480 are also displayed for each annotation. Replies 482 associated with comments may also be presented.

Figure 8C:
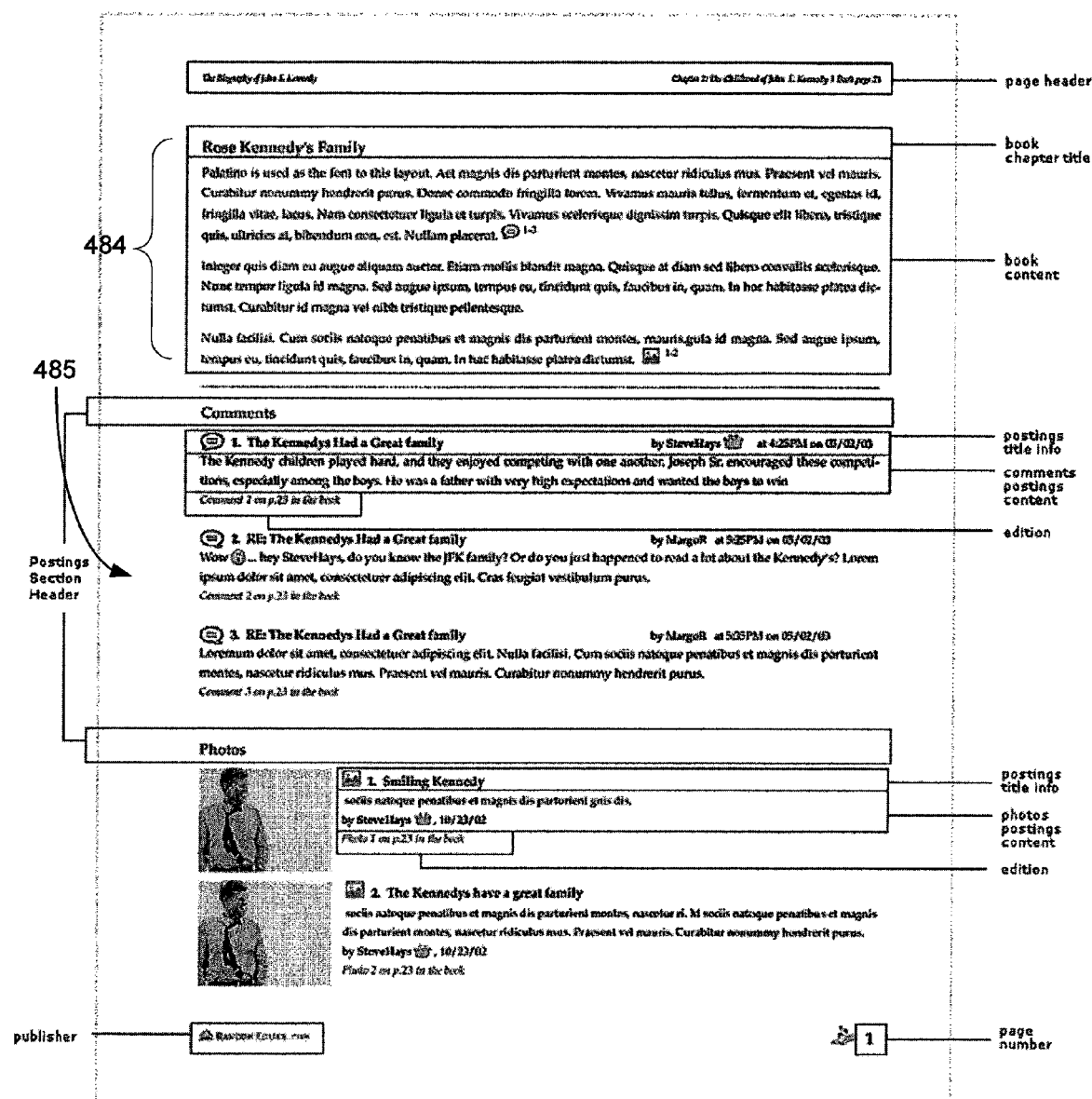
FIG. 8C is a screenshot of an exemplary dynamic print page according to an embodiment of the invention.

FIG. 8C presents a screenshot of an exemplary dynamic print page according to an embodiment of the invention. Dynamic print pages are generally formatted to include comments and other annotations just below the text to which they refer. As shown, the page includes the original text 484 including inline indications corresponding to the first portion of the display. The page also includes annotations such as text comments, images, etc. as would be presented online in the second portion of the display.

Figure 9:
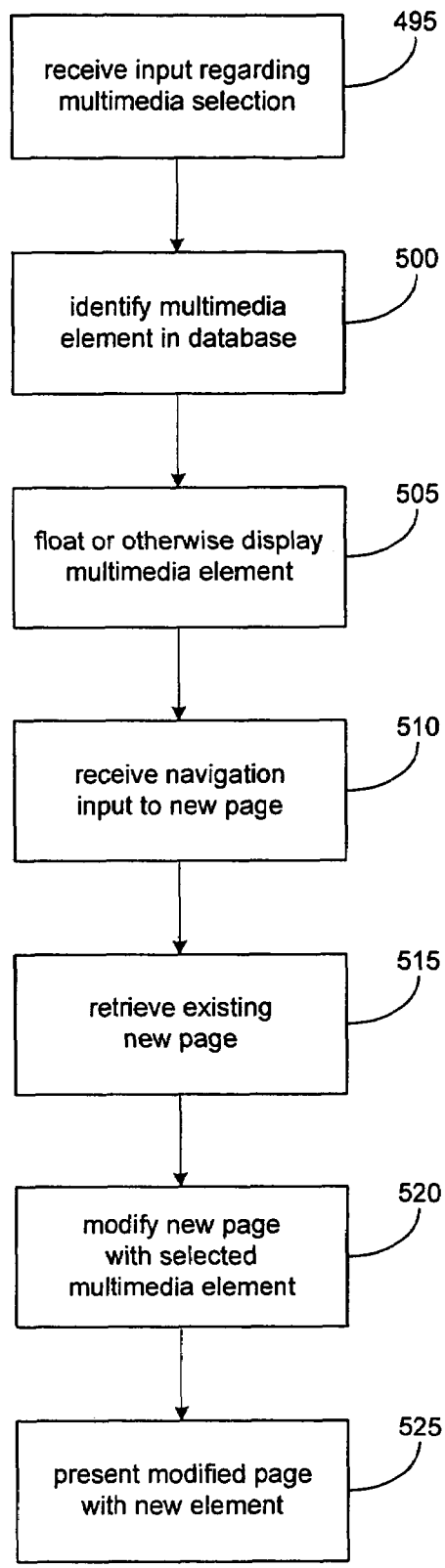
FIG. 9 is a flow chart of a method of presenting a selected multimedia element while navigating a document in shared annotation system according to an embodiment of the present invention.

FIG. 9 shows a method of presenting a selected multimedia element while navigating a document in shared annotation system according to an embodiment of the present invention. When viewing a multi-page document or viewing several documents, users may wish to visually retain presentation of a multimedia element, such as a chart, a table, a picture, etc. from one page while viewing content on another different page. For example, a user viewing several pages of a document related to a particular company's financial outlook might find it useful to retain a chart of the stock price or a table of pro forma income projections from one page while viewing information on a second page. In some embodiments, the system achieves the goal by allowing users to select a multimedia element and then floating the selected element on top of or integrating the selected element with subsequent pages that are viewed.

Thus, the user selects a multimedia element in a first page, such as a picture, using various input means previously described herein, step 495. The selected element is identified in the content database, step 500, and floated or otherwise displayed in the browser window, step 505. For example, the user client communicates the selected element identifier to the content server which retrieves another instance of the element and floats the element in the browser window containing the original content or displays the selected element in a new window or frame. In some embodiments, the system recreates the first page, removing the selected element and floats or otherwise displays the selected element over the location in the content where the selected element previously resided. In other embodiments, the system does not immediately float or otherwise display the selected element, but instead only identifies the selected element and only floats the selected element when the system receives input to navigate to a second page, step 510. In some embodiments, the system retrieves the original version of the second page stored in the database, step 515, and creates a new second page to display by modifying the second page and embedding the selected element from the first page, step 520. The modified second page is then presented with the original second page content now including the selected element, step 525.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention.

What is claimed is:

1. A method for creating a custom book, the method comprising:
    storing original content on one or more servers;
    displaying the original content on a web page to a plurality of users;
    receiving annotations to the original content from a plurality of users accessing the original content through remote client devices via a web browser, the annotations associated with annotation indicators, wherein the annotation indicators are embedded within the original content by inserting start tags and stop tags directly into the original content to identify the portion of the original content associated with the annotation indicators, wherein the start tags and stop tags are hypertext markup language compatible such that the annotation indicators continue to be displayed in association with the original content when users vary the size of the web page, add to the original content, or zoom in on portions of the original content, the annotations further comprising annotation content;
    assigning annotation identifiers to the annotations and wherein the annotation indicators comprise the annotation identifiers assigned to the annotations;
    storing the annotations, annotation identifiers, and annotation indicators in association with the original content on the one or more servers;
    allowing a first user to create a first custom book by allowing the first user to select at least a portion of the original content to be printed in a first custom book;
    determining the start tags and stop tags within the portion of original content selected by the first user;
    identifying the annotation identifiers associated with the start tags and stop tags within the portion of original content selected by the first user;
    using the annotation identifiers to identify a first group of annotations associated with the start tags and stop tags within the original content selected by the first user, wherein the first group of annotations contains annotations submitted by other users;
    allowing the first user to view the annotations in the first group of annotations associated with the original content selected by the first user;
    allowing the first user to select and deselect via a web browser, the annotations in the first group of annotations to create a first list of preferred annotations from the first group of annotations, wherein the first list of preferred annotations and the portion of the original content selected by the first user are stored at the one or more servers in association with a first user's account;
    maintaining the first list of preferred annotations and the portion of content selected by the first user at the one or more servers when the first user ceases accessing the original content;
    allowing a second user to create a second custom book by allowing the second user to select at least a portion of the original content to be printed in the second custom book, wherein the portion of the original content selected by the second user is different than the portion of the original content selected by the frst user;
    determining the start tags and stop tags within the portion of original content selected by the second user;
    identifying the annotation identifiers associated with the start tags and stop tags within the portion of original content selected by the second user;
    using the annotation identifiers to identify a second group of annotations associated with the start tags and stop tags within the original content selected by the second user, wherein the second group of annotations contains annotations submitted by other users;
    allowing the second user to view the annotations in the second group of annotations associated with the original content selected by the second user;
    allowing the second user to select and deselect via a web browser, the annotations in the second group of annotations to create a second list of preferred annotations from the second group of annotations, wherein the second list of preferred annotations and the portion of the original content selected by the second user are stored at the one or more servers in association with a second user's account; and
    maintaining the second list of preferred annotations and the portion of the original content selected by the second user at the one or more servers when the second user ceases accessing the original content;
    allowing the first user to view the portion of original content selected by the first user and the first list of preferred annotations maintained at the one or more servers when the first user accesses the original content another time; and at the first user's request, printing and binding at least the portion of the original content selected by the first user along with the first list of preferred annotations stored in association with the first user's account to create the first custom book.

2. The method of claim 1, wherein the first list of preferred annotations selected by the first user further comprises:
allowing the first user to select a list of preferred users; and
automatically selecting at least a portion of the first list of preferred annotations based on annotations submitted by users on the list of preferred users.

3. The method of claim 1, wherein the first list preferred of annotations selected by the first users is based upon ratings submitted by other users.

4. The method of claim 3, wherein the additional content elements include pictures.

5. The method of claim 3, wherein the additional content elements replace part of the original content.

6. The method of claim 1, wherein allowing the first user to select comprises allowing the first user to select each annotation individually.

7. The method of claim 1, wherein allowing the first user to select comprises allowing the first user to select criteria for selection of original content or the annotations.

8. The method of claim 7, wherein allowing the user to select criteria comprises allowing the user to select annotations based on the user or users from which they were received.

9. The method of claim 7, wherein allowing the user to select criteria comprises allowing the user to select annotations based on a type of annotation.

10. The method of claim 1, wherein receiving annotations from the plurality of users comprises receiving annotations over the internet.

11. The method of claim 10, wherein storing the original content comprises storing the content on the one or more servers in the form of one or more web pages, and wherein receiving annotations comprises receiving annotations input by the plurality of users using web browsers on their remote client devices.

12. The method of claim 1, wherein receiving annotations comprises receiving one or more text annotations representing comments on the original content.

13. The method of claim 12, wherein receiving annotations comprises receiving one or more annotations related to an image contained in the original content.

14. The method of claim 13, wherein receiving one or more annotations related to an image comprises receiving information identifying one or more subjects of the image.

15. The method of claim 14, comprising associating the one or more identified subjects with the image.

16. The method of claim 1, wherein receiving annotations comprises receiving multimedia annotations including graphical data, audio data, or video data.

17. The method of claim 1, comprising communicating to the first user an offer to purchase the original content.

18. The method of claim 17, comprising processing a request by the first user to purchase the original content.

19. The method of claim 1, wherein printing comprises, for each annotation related to a portion of the original content, printing the annotation and related portion on the same page of the book.

20. The method of claim 1, comprising authenticating each of the plurality of users before receiving an annotation from that user.

21. The method of claim 1, wherein the original content includes one or more photos, and wherein the method comprises allowing the first user to select a photo to replace a photo from the original content.

22. The method of claim 21, wherein allowing the first user to select a photo comprises allowing the first user to select a photo supplied by the party providing the original content.

23. The method of claim 21, wherein allowing the first user to select a photo comprise allowing the first user to select a photo uploaded to the one or more servers by a user.

24. The method of claim 23, wherein the photo is uploaded to the one or more servers by the first party.

* * * * *

UNITED STATES PATENT AND TRADEMARK OFFICE
CERTIFICATE OF CORRECTION

PATENT NO.        : 7,506,246 B2
APPLICATION NO. : 11/099817
DATED             : March 17, 2009
INVENTOR(S)       : Hollander et al.

It is certified that error appears in the above-identified patent and that said Letters Patent is hereby corrected as shown below:

In Drawing Sheet 2 of 17, reference numeral 183, Figure 2, please change "Statsistics" to --Statistics--.

In Drawing sheet 2 of 17, reference numeral 191, Figure 2, please change "Personalizaiton" to --Personalization--.

In Drawing Sheet 13 of 17, Box 460, please change "Text of the orginal paper book. Text of the orginal paper book. Text of the orginal paper book. Text of the orginal paper book. Text of the orginal paper book. Text of the orginal paper book." to --Text of the original paper book. Text of the original paper book. Text of the original paper book. Text of the original paper book. Text of the original paper book. Text of the original paper book.--.

In column 1, line 59, please change "6,43 8,564" to --6,438,564--.

In column 11, line 17, please change "II" to --I1--.

In column 11, line 19, please change "II" to --I1--.

In column 14, line 66, please change "('C.'" to --('C'--.

In column 18, line 39-47, please delete "For example...............step 450." and insert the same on Col. 18, line 38, after "document." as a continuation of the same paragraph.

In column 18, line 48, please change "resents" to --presents--.

In column 19, line 7, please change "user'own" to --user' own--.

In column 19, line 60, please change "usemame" to --username--.

In column 20, line 13, please change "usemame" to --username--.

UNITED STATES PATENT AND TRADEMARK OFFICE
CERTIFICATE OF CORRECTION

PATENT NO. : 7,506,246 B2
APPLICATION NO. : 11/099817
DATED : March 17, 2009
INVENTOR(S) : Hollander et al.

It is certified that error appears in the above-identified patent and that said Letters Patent is hereby corrected as shown below:

In column 21, line 42, please change "modifications" to --modification--.

In column 22, line 36, in Claim 1, please change "frst" to --first--.

Signed and Sealed this

Third Day of November, 2009

David J. Kappos
*Director of the United States Patent and Trademark Office*